(12) United States Patent
Tansley

(10) Patent No.: US 11,543,168 B2
(45) Date of Patent: Jan. 3, 2023

(54) PORTABLE REFRIGERATION APPARATUS

(71) Applicant: The Sure Chill Company Limited, Cardiff (GB)

(72) Inventor: Ian Tansley, Tywyn (GB)

(73) Assignee: THE SURE CHILL COMPANY LIMITED

(*) Notice: Subject to any disclaimer, the term of this patent is extended or adjusted under 35 U.S.C. 154(b) by 95 days.

(21) Appl. No.: 16/890,826

(22) Filed: Jun. 2, 2020

(65) Prior Publication Data
US 2020/0292223 A1    Sep. 17, 2020

Related U.S. Application Data

(63) Continuation of application No. 15/262,486, filed on Sep. 12, 2016, now Pat. No. 10,704,822.
(Continued)

(51) Int. Cl.
*F25D 16/00* (2006.01)
*B65D 81/38* (2006.01)
(Continued)

(52) U.S. Cl.
CPC ........... *F25D 16/00* (2013.01); *B65D 81/382* (2013.01); *F25B 27/002* (2013.01); *F25D 3/06* (2013.01);
(Continued)

(58) Field of Classification Search
CPC ............ B65D 81/382; F25D 2303/083; F25D 2303/0831; F25D 2303/0832; F25D 2303/08221
See application file for complete search history.

(56) References Cited

U.S. PATENT DOCUMENTS

| 186,200 A | 1/1877 | Crisfield |
| 213,885 A | 4/1879 | Fox |

(Continued)

FOREIGN PATENT DOCUMENTS

| CN | 2062629 U | 9/1990 |
| CN | 2162269 Y | 4/1994 |

(Continued)

OTHER PUBLICATIONS

Notice of Allowance dated Jan. 26, 2021 of Vietnamese Patent Application No. 1-2014-02788 (2 pages).
(Continued)

*Primary Examiner* — Christopher R Zerphey
(74) *Attorney, Agent, or Firm* — Perkins Coie LLP; Colin Fowler

(57) ABSTRACT

The present application is related to a portable refrigeration apparatus for vaccines, food items, beverage containers, or any other item. The apparatus includes a refrigerated container comprised of a plurality of substantially identical chilling panels interconnected to form a sealed container that defines an internal volume, each of the chilling panels containing a cooling element. The refrigerated container encloses an internal storage space and has a generally modular design to facilitate packaging and transportation. The apparatus permits the internal storage space to maintain a temperature in the range of 4° C.~8° C. for a long period of time following a loss of electrical power.

20 Claims, 16 Drawing Sheets

Related U.S. Application Data

(60) Provisional application No. 62/217,581, filed on Sep. 11, 2015.

(51) Int. Cl.
| | |
|---|---|
| *F25B 27/00* | (2006.01) |
| *F25D 3/06* | (2006.01) |
| *F25B 21/02* | (2006.01) |
| *F25D 23/06* | (2006.01) |

(52) U.S. Cl.
CPC ............ *F25B 21/02* (2013.01); *F25D 23/063* (2013.01); *F25D 2303/0831* (2013.01); *F25D 2303/0832* (2013.01); *Y02P 60/85* (2015.11)

(56) References Cited

U.S. PATENT DOCUMENTS

| | | |
|---|---|---|
| 1,402,602 A | 1/1922 | Hansen |
| 1,594,015 A | 7/1926 | William |
| 1,885,837 A | 11/1932 | Kellogg et al. |
| 1,951,496 A | 3/1934 | Stevens |
| 1,982,570 A | 11/1934 | Cann |
| 1,988,549 A | 1/1935 | Lowell |
| 2,046,967 A | 7/1936 | Post et al. |
| 2,130,790 A | 9/1938 | Dick et al. |
| 2,495,878 A | 1/1950 | Tull |
| 2,641,109 A | 6/1953 | Glenn |
| 2,973,630 A | 3/1961 | Kriechbaum |
| 2,975,610 A | 3/1961 | Olson |
| 3,049,890 A | 8/1962 | Ruppel |
| 3,609,991 A | 10/1971 | Chu et al. |
| 3,721,104 A | 3/1973 | Adler |
| 4,065,336 A | 12/1977 | Conklin |
| 4,498,312 A | 2/1985 | Schlosser |
| 4,509,587 A | 4/1985 | Clark et al. |
| 4,715,195 A | 12/1987 | Kucza |
| 4,958,506 A | 9/1990 | Guilhem et al. |
| 5,035,122 A | 7/1991 | Oogjen |
| 5,129,238 A | 7/1992 | Schwartz et al. |
| 5,237,835 A | 8/1993 | Brochier |
| 5,379,596 A | 1/1995 | Grayson |
| 5,408,845 A | 4/1995 | Clarke et al. |
| 5,627,310 A | 5/1997 | Johnson |
| 5,782,095 A | 7/1998 | Chen et al. |
| 6,119,462 A | 9/2000 | Busick et al. |
| 6,314,751 B1 | 11/2001 | Gjersvik |
| 6,367,268 B1 | 4/2002 | Paul |
| 6,381,981 B1 | 5/2002 | Yaddgo et al. |
| 6,415,624 B1 | 7/2002 | Connors et al. |
| 6,469,487 B2 | 10/2002 | Ewert et al. |
| 6,681,594 B1 | 1/2004 | Nelson |
| 6,698,210 B2 | 3/2004 | Ogura et al. |
| 6,845,627 B1 | 1/2005 | Buck |
| 7,055,575 B2 | 6/2006 | Noel |
| 7,543,455 B1 | 6/2009 | Chen |
| 8,215,125 B2 | 7/2012 | Linder |
| 8,424,335 B2 | 4/2013 | Corder et al. |
| 8,516,849 B2 | 8/2013 | Mooijer et al. |
| 8,640,487 B2 | 2/2014 | Chapa |
| 8,943,846 B1 | 2/2015 | Hartley et al. |
| 9,618,253 B2 | 4/2017 | Tansley |
| 9,644,882 B2 | 5/2017 | Tansley |
| 9,909,799 B2 | 3/2018 | Tansley |
| 9,944,449 B2 * | 4/2018 | Wood ..................... B65D 81/18 |
| 2002/0050147 A1 | 5/2002 | Mai et al. |
| 2002/0104318 A1 | 8/2002 | Jaafar et al. |
| 2003/0070436 A1 | 4/2003 | Wood et al. |
| 2004/0123620 A1 | 7/2004 | Porter |
| 2005/0035120 A1 * | 2/2005 | Hull ........................ A45C 11/20 220/23.87 |
| 2005/0229626 A1 | 10/2005 | Akopyan |
| 2006/0174648 A1 | 8/2006 | Lantz |
| 2006/0230778 A1 | 10/2006 | Williams |
| 2006/0248918 A1 | 11/2006 | Robertson et al. |
| 2006/0277939 A1 | 12/2006 | Beks et al. |
| 2007/0051734 A1 * | 3/2007 | Kuhn ..................... F25D 23/063 220/592.27 |
| 2007/0095091 A1 | 5/2007 | Cyr |
| 2008/0060374 A1 | 3/2008 | Gammons et al. |
| 2008/0092559 A1 | 4/2008 | Williams et al. |
| 2008/0135564 A1 | 6/2008 | Romero |
| 2008/0141875 A1 | 6/2008 | Fahrenback |
| 2009/0151368 A1 | 6/2009 | Bar |
| 2010/0018221 A1 | 1/2010 | Flinner et al. |
| 2010/0102057 A1 | 4/2010 | Long et al. |
| 2010/0293970 A1 | 11/2010 | Mooijer et al. |
| 2010/0319386 A1 | 12/2010 | Linder |
| 2011/0006852 A1 | 1/2011 | Koyama et al. |
| 2011/0120151 A1 | 5/2011 | Cutting et al. |
| 2012/1029941 | 2/2012 | Malave et al. |
| 2012/0102994 A1 | 5/2012 | Tansley |
| 2012/0266627 A1 | 10/2012 | Lee et al. |
| 2013/0000334 A1 | 1/2013 | Kim et al. |
| 2014/0360214 A1 | 12/2014 | Tansley |
| 2016/0018151 A1 | 1/2016 | Tansley |
| 2016/0152402 A1 | 6/2016 | Su |
| 2016/0216023 A1 | 7/2016 | Tansley |
| 2016/0243000 A1 | 8/2016 | Gray |
| 2017/0082344 A1 | 3/2017 | Tansley et al. |

FOREIGN PATENT DOCUMENTS

| | | |
|---|---|---|
| CN | 2162629 Y | 4/1994 |
| CN | 1097505 A | 1/1995 |
| CN | 1133631 A | 10/1996 |
| CN | 2379760 Y | 5/2000 |
| CN | 1732363 A | 2/2006 |
| CN | 1836137 A | 9/2006 |
| CN | 1893863 A | 1/2007 |
| CN | 201451827 U | 5/2010 |
| CN | 201457996 U | 5/2010 |
| CN | 201710535 U | 1/2011 |
| CN | 102483280 A | 5/2012 |
| CN | 103988144 A | 8/2014 |
| CN | 104364592 A | 2/2015 |
| DE | 240333 A1 | 10/1986 |
| DE | 3627201 A1 | 4/1987 |
| DE | 4142842 A1 | 4/1993 |
| DE | 4425213 A1 | 1/1996 |
| EP | 0038864 A1 | 11/1981 |
| EP | 0491671 A1 | 6/1992 |
| EP | 0505208 A2 | 9/1992 |
| EP | 1293738 A1 | 3/2003 |
| EP | 1538409 A2 | 6/2005 |
| EP | 1421323 B1 | 3/2008 |
| FR | 2537712 A1 | 6/1984 |
| FR | 2562218 A1 | 10/1985 |
| GB | 165684 A | 7/1921 |
| GB | 494531 A | 10/1938 |
| GB | 1429678 A | 3/1976 |
| GB | 2235968 A | 3/1991 |
| GB | 2281773 A | 3/1995 |
| GB | 2430724 A | 4/2007 |
| GB | 2457054 A | 8/2009 |
| GB | 2471865 A | 1/2011 |
| JP | S57112682 A | 7/1982 |
| JP | H05-79741 A | 3/1993 |
| JP | H08313141 A | 11/1996 |
| JP | H10144361 A | 5/1998 |
| JP | 2001133109 A | 5/2001 |
| JP | 2001221553 A | 8/2001 |
| JP | 2001227847 A | 8/2001 |
| JP | 2002013855 A | 1/2002 |
| JP | 2003148849 A | 5/2003 |
| JP | 2004043020 A | 2/2004 |
| JP | 2012-002496 | 1/2012 |
| SU | 898226 A1 | 1/1982 |
| WO | 2002018210 A1 | 3/2002 |
| WO | 2006103084 A1 | 10/2006 |
| WO | 2009005008 A1 | 1/2009 |
| WO | 2009072876 A1 | 6/2009 |
| WO | 2010086167 A1 | 8/2010 |
| WO | 2011007162 A2 | 1/2011 |

(56) References Cited

FOREIGN PATENT DOCUMENTS

| WO | 2013089678 A1 | 6/2013 |
|---|---|---|
| WO | 2013091913 A1 | 6/2013 |
| WO | 2013110957 A2 | 8/2013 |
| WO | 2017039437 A1 | 3/2017 |

OTHER PUBLICATIONS

Notification to Grant Patent Right for Invention dated Jan. 22, 2021 of Chinese Patent Application No. 201680066195.7 (2 pages).
Applicant-Initiated Interview Summary dated Jan. 27, 2020 of U.S. Appl. No. 14/373,580 by Tansley, T., filed Jul. 21, 2014.
Brazilian Office Action of Application No. BR112014018324.4 dated Mar. 3, 2020 (8 pages).
Brazilian Office Action of Application No. PI1015971-1 dated Sep. 4, 2019 (8 pages).
Colombian Examination Report for Colombian Application No. 15-202569 with International filing date of Jan. 28, 2014; dated Sep. 9, 2016.
Colombian Examination Report dated Jul. 14, 2015 in Colombian Patent Application No. 14-163243, English translation unavailable, 9 pages.
European Examination Report dated Nov. 6, 2019 of European Patent Application No. 13705226.2 (5 pages).
Examination Report for Canadian Application No. 2,767,864, dated May 13, 2016, 4 pages.
Examination Report for Indian Application No. 6047/DELNP/2014; dated Mar. 29, 2019; 8 pages.
Examination Report for U.K. Application No. GB1415033.8; dated Oct. 30, 2018; 5 pages.
Examination Report for United Kingdom Patent Application No. GB1201437.9, dated Apr. 7, 2014, 2 pages.
Examination Report dated Aug. 3, 2016 in Egyptian Patent Application No. 2014071169, with English translation, 7 pages.
Examination Report dated Dec. 23, 2014 in Egyptian Patent Application No. 2012010066, with English translation, 7 pages.
Examination Report dated Jan. 5, 2017 in Egyptian Patent Application No. 2012010066, with English translation, 7 pages.
Examination Report dated Feb. 21, 2017 in Canadian Application No. 2,767,864, 3 pages.
Examination Report dated Oct. 19, 2016 in European Patent Application No. 10739675.6, 5 pages.
Extended European Search Report for European Application No. 16845259.7; dated Apr. 3, 2019; 8 pages.
Final Office Action dated Dec. 27, 2019 of U.S. Appl. No. 14/373,580 by Tansley, T., filed Jul. 21, 2014.
Final Office Action dated Aug. 29, 2016 in U.S. Appl. No. 13/383,118 of Tansley, Ian filed Jan. 9, 2012.
Final Office Action dated Feb. 5, 2016 in U.S. Appl. No. 13/383,118 of Tansley, Ian filed Jan. 9, 2012.
Final Office Action dated Jan. 26, 2018 of U.S. Appl. No. 14/373,580 by Tansley, I., filed Jul. 21, 2014.
Final Office Action dated Nov. 5, 2014 in U.S. Appl. No. 13/383,118 of Tansley, Ian filed Jan. 9, 2012.
Final Substantive Examination Report Restriction dated Nov. 26, 2018, for Philippines Patent Application No. 1-2014-501668, 2 pages.
First Examination Report dated Feb. 1, 2018 for Indian Patent Application No. 10304/DELNP/2011 filed Jul. 9, 2010, 6 pages.
First Examination Report dated Mar. 24, 2017 in European Patent Application No. 13705226.2, 4 Pages.
First Office Action dated Jun. 27, 2017 in Chinese Patent Application No. 201480052383.5, 29 pages.
First Office Action dated Nov. 28, 2016 in Chinese Patent Application No. 201510186465.5, with English translation, 20 pages.
First Office Action dated Nov. 6, 2015 in Chinese Patent Application No. 201380017447.3, with English translation, 66 pages.
First Office Action dated Apr. 21, 2016 in Eurasian Patent Application No. 201491428/31, with English translation, 5 pages.

First Office Action dated Dec. 26, 2014 in Eurasian Patent Application No. 201270161, 6 pages.
First Office Action dated Jun. 2, 2015 in Japanese Patent Application No. 2012-520097, with English translation, 7 pages.
First Office Action dated Mar. 25, 2015 in Vietnamese Patent Application No. 1-2012-00156, English translation unavailable, 1 page.
First Office Action dated Sep. 5, 2014 in Philippine Patent Application No. 1/2012/500102, 1 page.
First Office Action dated Nov. 28, 2019 of Chinese Patent Application No. 201680066195.7 (13 pages).
Great Britain Examination Report for GB Application 1401455.9; dated Sep. 15, 2014.
India Office Action dated Aug. 22, 2019 for Application No. 7235/DELNP/2015 (7 pages).
International Search Report and Written Opinion dated May 6, 2015, for International Patent Application No. PCT/GB2014/050218 filed Jan. 28, 2014.
International Search Report and Written Opinion PCT/GB13/50184 dated Oct. 2, 2013, pp. 1-9.
International Search Report and Written Opinion PCT/GB2010/051129 dated Apr. 4, 2011, pp. 1-9.
International Search Report and Written Opinion PCT/GB2014/052255 dated Sep. 26, 2014, pp. 1-15.
International Search Report and Written Opinion PCT/US16/51273 dated Jan. 26, 2017, pp. 1-10.
Mexican Office Action dated Apr. 15, 2019 of Application No. MX/A/2014/009028, filed Jan. 28, 2013, 3 pages.
Non-Final Office Action dated Apr. 27, 2017 in U.S. Appl. No. 14/373,580 of Tansley, Ian filed Jul. 21, 2014.
Non-Final Office Action dated Aug. 3, 2016 in U.S. Appl. No. 15/003,386 of Tansley, Ian filed Jan. 21, 2016.
Non-Final Office Action dated Dec. 20, 2017 in U.S. Appl. No. 15/262,486 of Tansley, Ian filed Sep. 12, 2016.
Non-Final Office Action dated Jan. 31, 2017 in U.S. Appl. No. 15/262,486 of Tansley, I. filed Sep. 12, 2016.
Non-Final Office Action dated Jul. 14, 2015 in U.S. Appl. No. 13/383,118 of Tansley, Ian filed Jan. 9, 2012.
Non-Final Office Action dated Jun. 13, 2019 in U.S. Appl. No. 14/373,580 of Tansley, Ian filed Jul. 21, 2014.
Non-Final Office Action dated Mar. 12, 2014 in U.S. Appl. No. 13/383,118 of Tansley, Ian filed Jan. 9, 2012.
Non-Final Office Action dated May 12, 2016 in U.S. Appl. No. 13/383,118 of Tansley, Ian filed Jan. 9, 2012.
Non-Final Office Action dated May 16, 2017 for U.S. Appl. No. 14/767,904 of Tansley, Ian, filed Aug. 13, 2015.
Non-Final Office Action dated Sep. 7, 2018 of U.S. Appl. No. 14/373,580 by Tansley, T., filed Jul. 21, 2014.
Notice for Granting Patent dated Sep. 5, 2017 for Korean Patent Application No. 10-2012-7000384, 6 pages.
Notice of Allowance for Indonesian Patent Application No. P-00201404548; dated Dec. 13, 2018; 3 pages.
Notice of Allowance for U.S. Appl. No. 15/262,486 dated Mar. 18, 2020.
Notice of Allowance dated Dec. 2, 2016 in U.S. Appl. No. 13/383,118 of Tansley, Ian filed Jan. 9, 2012.
Notice of Allowance dated Jan. 30, 2017 in U.S. Appl. No. 15/003,386 of Tansley, Ian filed Jan. 21, 2016.
Notice of Allowance dated Nov. 1, 2017 for U.S. Appl. No. 14/767,904 of Tansley, Ian filed Aug. 13, 2015.
Notice of Grant for Indonesian Patent Application No. P-00201404548; dated Dec. 13, 2018, 2 pages.
Notice of Preliminary Rejection for Korean Application No. 10-2014-7023087; dated Feb. 6, 2019; with English translation, 25 pages.
Notification to Grant Patent Right for Invention dated Nov. 6, 2017 for Chinese Patent Application No. 201380017447.3, 4 pages.
Notification to Grant Patent Right for Invention for Chinese Application No. 201510186465.5; dated Sep. 5, 2018; 4 pages.
Office Action for Indonesian Patent Application No. P-00201404548; dated Aug. 24, 2018; 3 pages.
Office Action from Philippines Application No. 1-2014-501668 dated Dec. 5, 2018 (5 pages).

(56) References Cited

OTHER PUBLICATIONS

Office Action in Eurasian Patent Application No. 201591385/31, dated Aug. 30, 2016, 6 pages.
Office Action in Japanese Patent Application No. 2015-236753 with English translation, dated Apr. 11, 2017, 10 pages.
Office Action in Mexican Application No. MX/a/2014/009028; dated Apr. 15, 2019; 4 pages.
Office Action in Mexican Application No. MX/a/2014/009028; dated Nov. 11, 2019; 4 pages.
Office Action dated May 28, 2015 in Thailand Patent Application No. 1401004332, English translation unavailable, 1 page.
Patent Examination Report No. 1 for Australian Application No. 2015202391, dated May 2, 2016, 3 pages.
Restriction Requirement Action dated May 16, 2016 in U.S. Appl. No. 15/003,386 of Tansley, Ian filed Jan. 21, 2016.
Restriction Requirement dated Dec. 31, 2013 in U.S. Appl. No. 13/383,118 of Tansley, Ian filed Jan. 9, 2012.
Restriction Requirement dated Jan. 4, 2017 in U.S. Appl. No. 14/373,580 of Tansley, Ian filed Jul. 21, 2014.
Second Notice of Preliminary Rejection dated Dec. 18, 2019 for Korean Application No. 10-2014-7023087 (3 pages).
Second Office Action dated Aug. 11, 2017 in Chinese Patent Application No. 201510186465.5, with English translation, 17 pages.
Second Office Action dated Aug. 26, 2016 in Chinese Patent Application No. 201380017447.3, with English translation, 37 pages.
Second Office Action dated May 28, 2018, in Chinese Patent Application No. 201480052383.5, 22 pages.
Second Office Action dated Apr. 3, 2015 in Eurasian Patent Application No. 201270161, with English translation, 6 pages.
Second Office Action dated Aug. 4, 2015 in Japanese Patent Application No. 2012-520097, with English translation, 6 pages.
Second Office Action dated Dec. 21, 2016 in Eurasian Patent Application No. 201491428/31, with English translation, 3 pages.
Second Office Action dated Dec. 3, 2014 in Philippine Patent Application No. 1/2012/500102, 3 pages.
Second Office Action dated Nov. 12, 2014 in Mexican Patent Application No. MX/a/2012/000719, with English translation, 7 pages.
Subsequent Substantive Examination Report dated Feb. 15, 2018 for Philippines Patent Application No. 1-2014-501668, 7 pages.
Substantive Examination Report Restriction dated Apr. 7, 2017 for Philippines Patent Application No. 1-2014-501668, 3 pages.
Substantive Search and Examination Report dated Aug. 4, 2016 in ARIPO Application No. AP/P/2014/007819, 4 pages.
Substantive Search and Examination Report dated Nov. 5, 2014 in ARIPO Application No. AP/P/2012/006111, 32 pages.
Third Office Action dated Apr. 19, 2018 in Chinese Patent Application No. 201510186465.5, with English translation, 8 pages.
Third Office Action dated Feb. 23, 2017 in Chinese Patent Application No. 201380017447.3, with English translation, 33 pages.
Third Office Action dated Aug. 30, 2017 in Eurasian Patent Application No. 201491428/31, with English translation, 4 pages.
Third Office Action dated Jul. 1, 2015 in Mexican Patent Application No. MX/a/2012/000719, with English translation, 4 pages.
Third Office Action dated Jun. 1, 2015 in Philippine Patent Application No. Jan. 2012/500102, 1 page.
Third Office Action dated Mar. 28, 2016 in Eurasian Patent Application No. 201270161, with English translation, 5 pages.
U.S. Appl. No. 13/383,118 of Tansley, Ian filed Jan. 9, 2012.
U.S. Appl. No. 15/003,386 of Tansley, Ian filed Jan. 21, 2016.
U.S. Appl. No. 15/262,486 of Tansley, Ian filed Sep. 12, 2016.
Vietnamese Office Action dated Jul. 31, 2019 for Application No. 1-2014-02788 3 pages.

* cited by examiner

PORTABLE REFRIGERATION APPARATUS

CROSS-REFERENCE TO RELATED APPLICATION(S)

This application is a continuation of pending U.S. patent application Ser. No. 15/262,486 filed on Sep. 12, 2016, which claims priority to and benefit from U.S. Provisional Patent Application No. 62/217,581 titled "PORTABLE REFRIGERATION APPARATUS" filed on Sep. 11, 2015, the content of which is incorporated by reference in its entirety herein.

This application is related to U.K. Patent Application Publication No. GB2503191 (Application No. 1201437.9) (Inventors: Tansley), filed Jan. 27, 2012, titled "Refrigeration Apparatus," and U.K. Patent Application Publication No. GB2482993 (Application No. 1115918.3) (Inventors: Tansley), filed Sep. 15, 2009, titled "Refrigeration Apparatus," both of which are hereby incorporated by reference for all purposes.

TECHNICAL FIELD

The present invention relates to a refrigeration apparatus. In particular, but not exclusively, the invention relates to a portable refrigeration apparatus for cooling or temperature control even in the absence of a reliable supply of electricity.

BACKGROUND

A large proportion of the world's population does not have access to a consistent and reliable supply of mains electricity. Underdeveloped countries or regions remote from populated areas frequently suffer from rationing of electrical power, often implemented by means of "load shedding," that is, the creation of intentional power outages or failures of the electrical power distribution network.

The storage of vaccines, food items, and beverages at appropriate temperatures is difficult in such areas where this absence of a constant and/or reliable supply of electrical power restricts the widespread use of conventional refrigeration equipment. Vaccines, for example, are required to be stored within a narrow temperature range between approximately 2° C. and 8° C., outside of which their viability can be compromised or destroyed. Similar problems arise in connection with the storage of food, particularly perishable food items, and packaged beverages such as canned or bottled drinks.

DETAILED DESCRIPTION

The present application is related to a portable refrigeration apparatus for vaccines, food items, drinks containers, or any other item to be cooled. The apparatus includes a container that encloses an internal storage space and has a generally modular design to facilitate packaging and transportation. The apparatus permits the internal storage space to maintain a temperature in the range of 4° C.~8° C. for a long period of time following a loss of electrical power.

From the foregoing, it will be appreciated that specific embodiments of the invention have been described herein for purposes of illustration, but that various modifications may be made without deviating from the scope of the invention. Accordingly, the invention is not limited except as by the appended claims.

Figure 1:
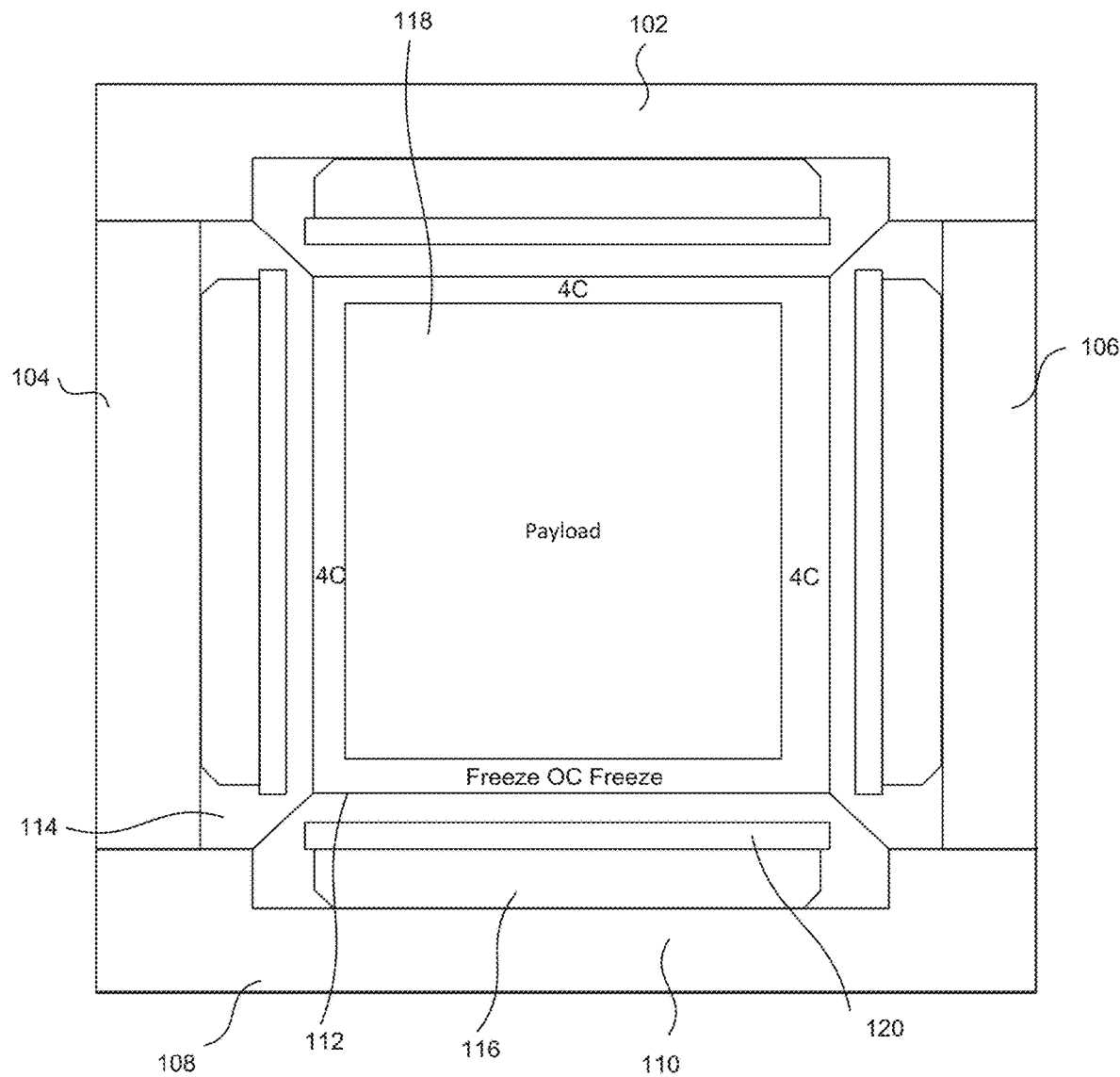
FIG. 1 illustrates an example portable refrigeration apparatus, specifically a cuboid container.

FIG. 1 illustrates a profile view of an example portable refrigeration apparatus, specifically a sealed refrigeration container. The sealed container in this illustration is a cube and thus comprises six chilling panels, including the top panel 102, two side panels 104 and 106, the bottom panel 108, and a front and back panel that are not shown. The six panels have similar structures that are oriented differently. Each panel includes a heat-insulating casing layer 110 that forms the exterior of the sealed container, and an inner liquid reservoir contained in a reservoir compartment 112. The reservoir compartment 112 is constructed of thermally conductive material. The inner liquid reservoir is full of a water solution 114. Up against the casing layer of each panel is a cooling element 116. The cooling element 116 may be a block or blocks of ice, ice packs made from freezable gel, or a powered cooling element such as a dual-surface, thermoelectric device.

In some embodiments, each chilling panel includes an internal thermal insulator layer 120. The internal thermal insulator 120 is positioned between the water solution 114 and the cooling element 116. The internal thermal insulator layer 120 is sized such that water solution 114 from the liquid reservoir is thermally insulated from the cooling element 116 parallel with a major plane of the chilling panel but allows contact on the sides of the cooling element 116. This helps establish a tandem weir effect in vertically oriented panels, discussed in greater detail in a later section of this disclosure.

As the sealed container rotates, the cooling effect of the different panels is interchanged. For example, as the sealed container rotates 90 degrees to the right, the top portion becomes one of the side portions, one of the side portions becomes the bottom portion, etc. The design of the container, which is based on a density of water, enables the payload to remain refrigerated for a long period of time without power supply.

A water solution 114 is a liquid solution that is, at least predominantly, if not entirely, water. Changes to the purity of the water will affect the temperature of the sealed container. The temperature of the internal volume 118 of the container tends toward the temperature of the highest density of the water solution 114. The purity of water further effects the heat capacity/heat of fusion.

One of the well-known anomalous properties of water is that its density is maximum at approximately 4° C. This means that a tank of water that is cooled close to its top will form a temperature gradient whereby the water toward the bottom of the tank will approach 4° C. The temperature at the bottom of the tank will not fall below this value unless the greater part of the water in the tank becomes frozen. While pure water is most dense at 4 degrees Celsius, impurities will adjust that critical density point. In use, adding impurities to the water solution 114 will adjust the temperature of the internal volume 118. For example, if salt is added to the water to a concentration of 3.5% (approximately that of sea water), then the maximum density occurs at nearer 2° C. This can be used to adjust the temperature of the payload space for specific applications.

Upright Configuration

Figure 2:
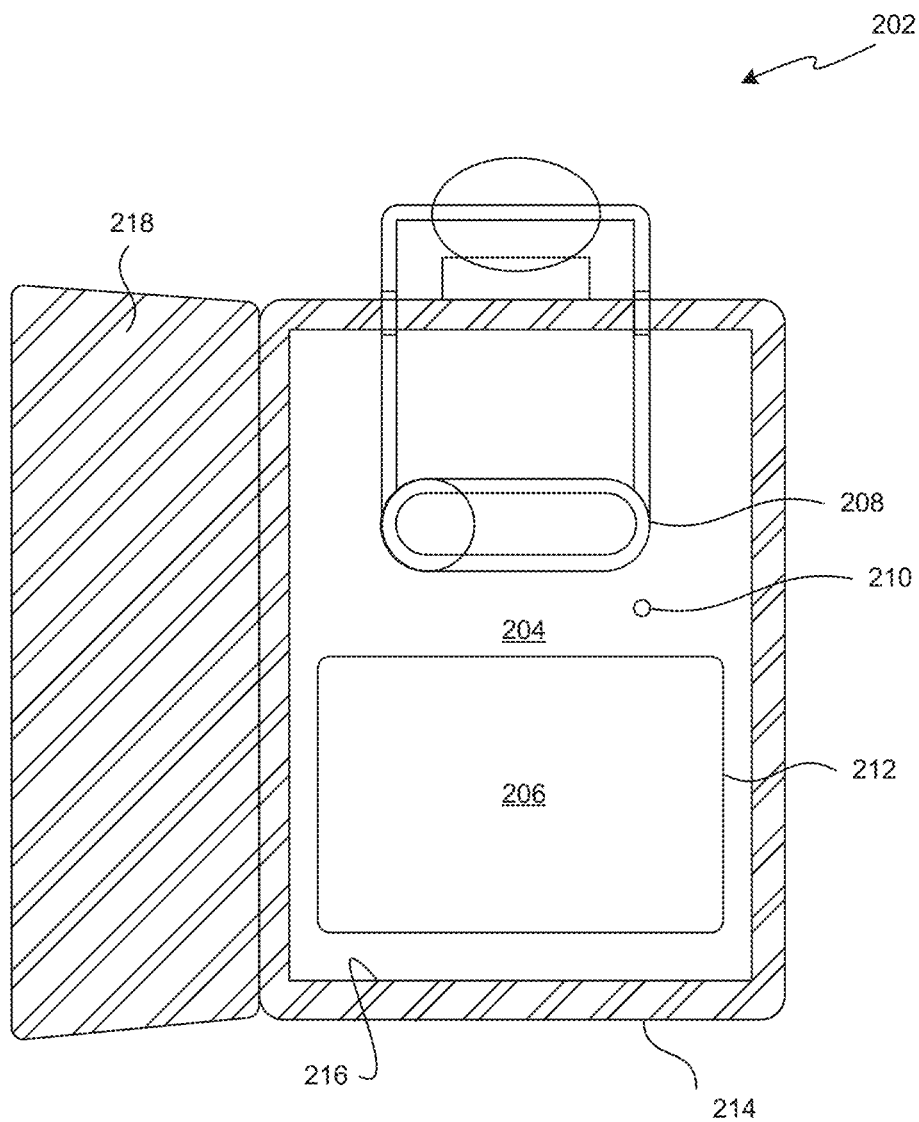
FIG. 2 illustrates an example refrigerated container in an "upright" configuration with a cooling means located within a reservoir above a cooling region.

FIG. 2 illustrates an example refrigerated container in an "upright" configuration with a cooling means located within a reservoir above a cooling region, as disclosed in U.K. Patent Application Publication No. GB2482993. This apparatus design applies to the top panel 102 of the portable refrigeration apparatus. The apparatus comprises a casing 216, which is, in this embodiment, shaped generally as an upright cuboid. The casing 216 is constructed to house a reservoir that, in use, contains a volume of water within an internal space 204. For instance, the casing 216 may be formed as a one-piece rotational molding of plastic material. Insulating material 214 is carried on outer surfaces of the casing 216 to minimize flow of heat through the casing to or from the water contained within it. The water largely fills the casing 216, but a small volume may be left unfilled to allow for expansion.

A payload space 206 is formed within the casing 216. The payload space 206 is located within a generally cuboidal box 212 that has one open face that opens horizontally to the exterior of the casing. The typical volume of the payload space 206 in embodiments may be in the range of 20 to 200 liters, but other embodiments, for specialist purposes, may have greater or lesser capacities. The other faces are located within the casing 216 and are submerged under the water that is contained within the casing 216. The submerged faces of the cuboidal box 212 have no insulation so that they are in thermal communication with the surrounding water in a cooling region of the reservoir. The cuboidal box 212 may optionally be integrally formed with the casing 216. When the refrigerator is disposed for use, the payload space 206 extends from close to the lowermost surface of the internal space 204 of the casing to appropriately half way toward the uppermost surface of the internal space 204.

A door 218 is mounted on one side of the casing 216. The door 218 can be opened to gain access to the payload space 206 through the open face. Insulating material is carried on the door 218 so that, when it is closed, it minimizes the amount of heat that can be transferred through it into or out of the payload space 206.

A refrigeration unit 202 is carried on a top surface of the casing 216 and provides the cooling means. In this embodiment, the refrigeration unit may be an absorption cooling unit, such as a single-pressure absorption refrigeration unit. The refrigeration unit 202 has a cooling element 208 that extends into the internal space 204 of the casing 216 and is submerged in the water. The cooling element 208 delivers cooling provided by the refrigeration unit 202 to the water such that ice may form in the water around the cooling element 208. The cooling element 208 is located in a water-filled headspace above the cuboidal box 212 such that it is spaced from the cuboidal box 212 by a layer of water, and likewise spaced from the uppermost surface of the casing 216. An optional ice probe 210 is located within the casing 216 above the cuboidal box 212 but below the cooling element 208. The ice probe 210 is electrically connected to control the refrigeration unit 202, as will be described below.

Operation of the refrigeration unit 202 will now be described. When the refrigeration unit 202 is first started, it can be assumed that all of the water is at or around the ambient temperature. The refrigeration unit 202 is run to cause its cooling element 208 to cool to a temperature that is typically well below the freezing point of water, for example, as low as −30° C. This, in turn, causes water in the immediate surroundings of the cooling element to cool. As the water cools, its density increases. This sets up an effect whereby the cooled water sinks in the casing 216, which displaces warmer water below. This warmer water rises, meets the cooling element 208, and is cooled. The average temperature of all of the water within the casing 216 falls. However, once the temperature of the water surrounding the cooling element 208 approaches 4° C., the rate of the effect decreases. This causes the lower part of the water to become comparatively stagnant, with a temperature of around 4° C. The water immediately surrounding the cooling element 208 may fall below this or may eventually freeze. However, the ice formed by this freezing will be less dense than the warmer water below, so the ice will float upward. Ice may continue to form and grow downward as cooling continues. Once the growing ice reaches the ice probe and is thus detected by the ice probe 210, power to the refrigeration unit 202 is cut, so no further ice will form. In this embodiment, there is still a clear layer of liquid water between the lowest part of the ice and the top of the cuboidal box 212, whereby the cuboidal box 212 and anything within the payload space 206 will remain above the freezing point of water. However, the extent to which ice can be allowed to grow in any particular embodiment without potentially harming a payload can be determined by experimentation. The extent to which ice is allowed to grow is determined by the use case or the required storage temperature range. Whilst most goods requiring preservation in the 2-8 C temperature band, many are tolerant to excursions down to 0 C.

Once the refrigeration unit 202 stops, assuming that ambient temperature is higher than the temperature of the water, energy will pass through the walls of the casing 216 into the water, which will start to warm. In the reverse of the cooling process, water in the lower part of the casing 216 will tend to stay around 4° C. while the ice melts. Following complete melting, the water will continue to warm, but water above 4° C. will tend to rise to the top of the casing 216. Thus, the payload space 206 will be maintained at or around 4° C. for as long as possible. As is well known, a large amount of energy is required to melt ice due to the latent heat of fusion. As energy is absorbed by the water, the payload space can be maintained at a substantially constant temperature during the time the ice melts. The payload of the refrigerator is therefore maintained at around 4° C., which is an ideal temperature for storage of vaccines, food, and beverages.

Tandem Configuration

Figure 3:
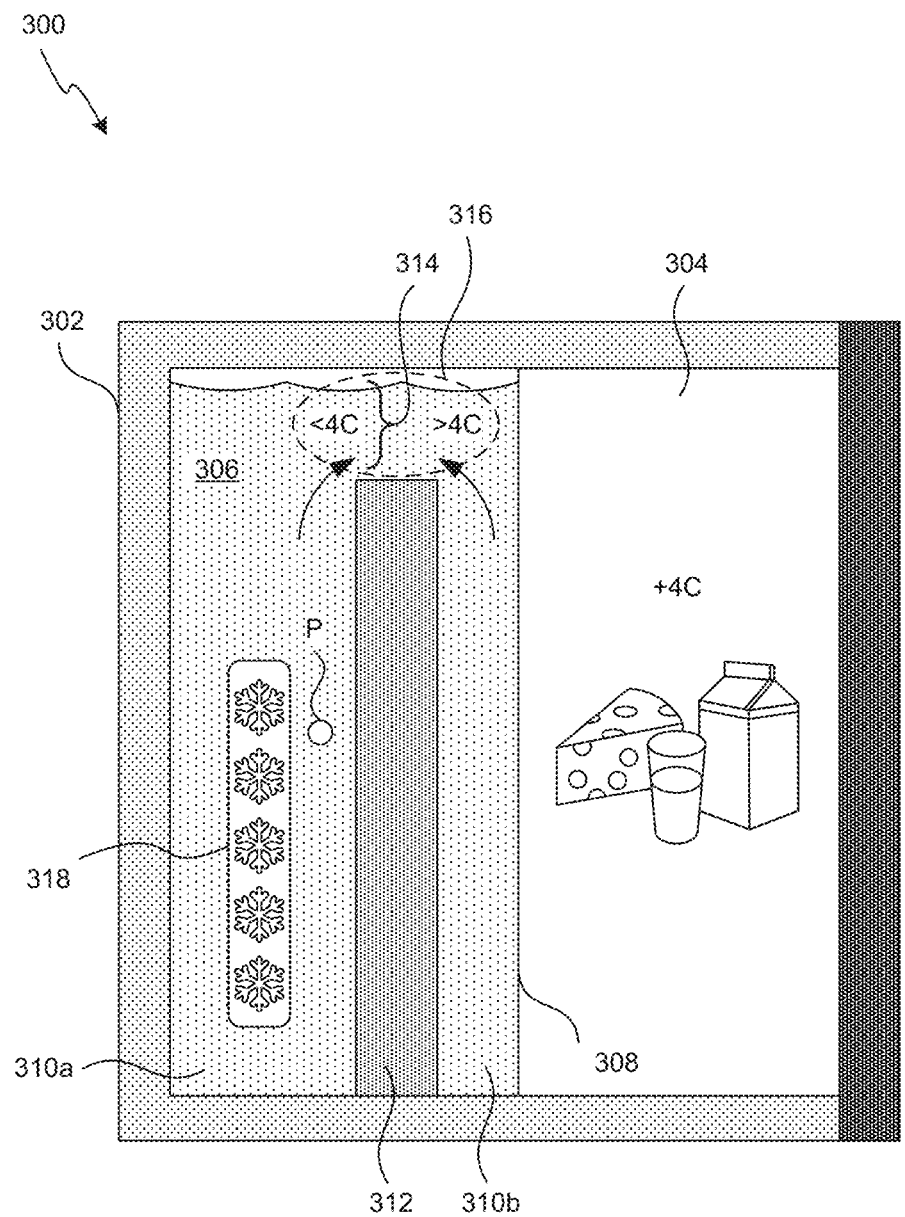
FIG. 3 illustrates an example refrigeration container in a "tandem" configuration with a cooling means located in a reservoir adjacent to a cooling region and separated by a wall.

FIG. 3 illustrates an example refrigerated container in a "tandem" configuration with a cooling means located in a reservoir adjacent to a cooling region and separated by a wall, as disclosed in U.K. Patent Application Publication No. GB2503191. This apparatus design would apply to the side portions of the refrigerated container. The apparatus comprises a casing 302, which is, in this embodiment, shaped generally as an upright cuboid. The casing 302 is formed from a thermally insulative material to reduce heat transfer into or out of the apparatus. For example, the casing 302 may be formed as a one-piece rotational molding of a plastic material. The volume within the casing 302 is divided into adjacent compartments, a payload compartment 304 and a fluid volume 306, by means of a separator comprising a thermally conductive wall 308 extending between the upper, lower, and side walls of the casing 302.

The fluid volume 306 is itself partially divided into respective first and second fluid reservoirs 310a, 310b by weir means in the form of a thermal barrier or wall 312 extending upwardly from the lower wall of the fluid volume 306 and fully between the side walls thereof. The wall 312 may be formed of substantially any material having suitable thermal insulative properties. In particular, it is advantageous for the wall 312 to be formed from a material having a low thermal conductivity so as to reduce thermal transfer therethrough between the first and second fluid reservoirs 310a, 310b.

In the illustrated embodiment, the wall 312 terminates a distance from the upper wall such that a slot or opening 314 is defined therebetween. The slot or opening 314 thereby provides a fluid and/or thermal flow path between upper regions of the respective first and second fluid reservoirs 310a, 310b. The first and second fluid reservoirs 310a, 310b are thus in fluid communication at their upper regions, which together define a fluid mixing region, shown approximately by the dashed line 316 and described below.

Cooling means, in the form of an electrically powered cooling element 318, is disposed within the first fluid reservoir 310a so as to be immersed in the fluid. The cooling element 318 is disposed in a lower region of the first fluid reservoir 310a and is spaced from the side, end, upper and lower walls of the reservoir by a layer of fluid. The apparatus has an external power supply (not shown) to supply electrical power to the cooling element 318. The power supply can operate from a supply of mains power in the absence of bright sunlight. The power supply can also operate from photovoltaic panels (not shown), whereby the apparatus can be run without the need of a mains electrical supply during sunny daytime conditions.

In some embodiments, the cooling element 318 may be arranged to cool fluid in the first fluid reservoir 310a by means of a refrigerant pumped therethrough by means of a pump external to the fluid volume 306. In some embodiments, the cooling element 318 is pumped by refrigerant that has been cooled by expansion of compressed refrigerant in the manner of a conventional vapor-compression refrigeration cycle.

The first and second fluid reservoirs 310a, 310b each contain a volume of a fluid having a negative temperature coefficient of thermal expansion below a critical temperature, and a positive temperature coefficient of thermal expansion above the critical temperature. In the illustrated embodiments, the fluid is water, the critical temperature of which is approximately 4° C. The water largely fills both fluid reservoirs 310a, 310b, but a small volume may be left unfilled in each to allow for expansion. Liquids other than water are also useful.

Operation of the apparatus will now be described. It can be assumed that all of the water in the first and second fluid reservoirs 310a, 310b is initially at or around the ambient temperature. The apparatus is activated such that electrical power is supplied to the cooling element 318, which thereby cools to a temperature that is typically well below the freezing point of water, for example, as low as −30° C. This, in turn, causes water in the immediate surroundings of the cooling element 318 within the first fluid reservoir 310a to cool. As the water cools, its density increases. The cooled water thus sinks toward the bottom of the first fluid reservoir 310a, displacing warmer water, which rises toward the upper region of the first fluid reservoir 310a.

It will be appreciated that, over time, most or all of the water contained in the first fluid reservoir 310a is cooled to a temperature of 4° C. or less. Because the density of water is at its maximum at the critical temperature, water at this temperature tends to pool at the bottom of the first fluid reservoir 310a, displacing lower temperature water toward the upper region of the first fluid reservoir 310a. This leads to a generally positive temperature gradient being generated within the first fluid reservoir 310a with water at the critical temperature lying in the lower region of the first fluid reservoir 310a and less dense, more buoyant water at temperatures below the critical temperature lying in the upper region adjacent the opening 314 at the junction between the first and second fluid reservoirs 310a, 310b.

At this junction, hereafter referred to as the fluid mixing region 316, water at temperatures below the critical temperature displaced upwardly by the sinking of water at the critical temperature within the first fluid reservoir 310a meets and mixes with warmer water, for example at approximately 10° C., disposed in the upper region of the second fluid reservoir 310b. A transfer of heat from the warmer water to the colder water thus occurs within the fluid mixing region 316, causing the cold water from the first fluid reservoir 310a and the warmer water from the second fluid reservoir 310b to increase and decrease in temperature, respectively, toward the critical temperature. The fluid mixing region 316 thus defines a thermal transfer region of the apparatus, wherein transfer of heat between fluid from the first and second fluid reservoirs 310a, 310b occurs.

As the cold water from the first fluid reservoir 310a rises in temperature toward the critical temperature, its density increases, and thus it sinks back down toward the cooling element 318, displacing warmer water below. Similarly, as the warmer water from the second fluid reservoir 310b reduces in temperature toward the critical temperature, its density increases and thus it also sinks down toward the lower region of the second fluid reservoir 310b, displacing warmer water below.

The water in the second fluid reservoir 310b, which is cooled following mixing within the fluid mixing region 316, pools at the bottom of the second fluid reservoir 310b, which, as described above, is disposed in thermal communication with the payload compartment 304. Heat from the payload compartment 304 is thus absorbed by the cooled volume of water in the second fluid reservoir 310b, and the temperature of the payload compartment 304, and hence the temperature of objects or items stored therein, begin to decrease.

To reiterate, water within the first fluid reservoir 310a, which is cooled to temperatures below the critical temperature by the cooling element 318, is displaced upwardly toward the fluid mixing region 316 by water at the critical temperature. Conversely, within the second fluid reservoir 310b, water above the critical temperature is displaced upwardly toward the fluid mixing region 316 by water at the critical temperature. Thus, water on either side of the thermal barrier 312, and at temperatures on either side of the critical temperature, merges and mixes within the fluid mixing region 316, causing the average temperature of the water in the mixing region 316 to approach the critical temperature and thus to cascade or sink back into the lower regions of the respective fluid reservoirs 310a, 310b.

Over time, this process reaches something approaching a steady state through the dynamic transfer of heat between water at temperatures below the critical temperature rising to the upper region of the first fluid reservoir 310a and water at temperatures above the critical temperature rising to the upper region of the second fluid reservoir 310b.

In addition, over time, despite the cooling element 318 being disposed in a lower region of the first fluid reservoir 310a, the temperature of the water in the second fluid reservoir 310b reaches a steady state temperature approximately at the critical temperature. In other words, much or all of the water in the second fluid reservoir 310b, particularly at the lower region thereof, becomes comparatively stagnant, with a temperature of around 4° C. Water heated above the critical temperature by absorption of heat from the payload compartment 304 is displaced toward the fluid mixing region 316 by water at the critical temperature descending from the fluid mixing region 316, having been cooled by the below-critical temperature water in the upper region of the first fluid reservoir 310a.

Through absorption of heat from the payload compartment 304 by the water in the second fluid reservoir 310b, the payload compartment 304 is maintained at a desired temperature of approximately 4° C., which is ideal for storing many products, including vaccines, food items, and beverages.

It is to be understood that fluid in contact with the cooling element 318 will typically freeze, and a solid mass of frozen fluid or ice will form in the first fluid reservoir 310a. An ice detector may be provided for detecting the formation of ice once the ice has grown to a critical size. Once the detector detects the formation of ice of the critical size, the apparatus may be arranged to switch off the cooling element 318 to prevent further ice formation. Once the mass of frozen fluid has subsequently shrunk to a size below the critical size, the cooling element 318 may be reactivated. The detector may be in the form of a thermal probe in thermal contact with fluid a given distance from the cooling element 318. Fluid in thermal contact with the detector will fall to a temperature at or close to that of the frozen fluid once the frozen fluid comes into contact with the detector. It is to be understood that a relatively abrupt temperature change typically takes place between the mass of frozen ice and fluid in contact with the ice within a very short distance from the frozen mass.

In the event that the power supply to the cooling element 318 is interrupted or disconnected, the displacement process imparted upon the water within the first and second fluid reservoirs 310a, 310b continues while the mass of frozen fluid remains in the first fluid reservoir 310a. Once the mass of frozen fluid is exhausted, the displacement process will begin to slow but is maintained by the continued absorption of heat from the payload compartment 304 by the water in the second fluid reservoir 310b. Due to the high specific heat capacity of water and the significant volume of water at temperatures below the critical temperature within the fluid volume, the temperature in the lower region of the second fluid reservoir 310b remains at or close to 4° C. for a considerable length of time.

That is to say, even without a supply of electrical power to the cooling element 318, the natural tendency of water at the critical temperature to sink and displace water above or below the critical temperature results in the first and second fluid reservoirs 310a, 310b, or at least the lower regions thereof, to hold water at or around the critical temperature for some time after loss of power, enabling the payload compartment 304 to be maintained within an acceptable temperature range for extended periods of time. Embodiments of the present invention are capable of maintaining fluid in the second reservoir 310b at a target temperature for a period of up to several weeks.

Figure 4A:
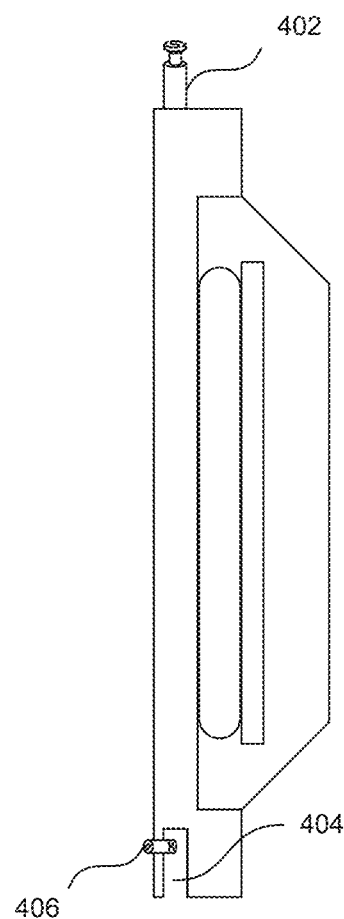
FIG. 4A is a first embodiment of a chilling panel interconnection emphasizing male/female locks.

FIG. 4A is a first embodiment of a chilling panel interconnection emphasizing male/female locks from a side view perspective. In some embodiments, in order to interconnect the chilling panels, an insert lock 402 is located on two adjacent sides of the chilling panel, and receiving bays 404 for the insert locks 402 are located on the other two adjacent sides of the chilling panel. Once inserted, the insert lock 402 is tightened down in the receiving bay 404 with a locking mechanism 406, such as a screw, a pressure lock, a bolt lock, or other suitable locking mechanisms known in the art.

Figure 4B:
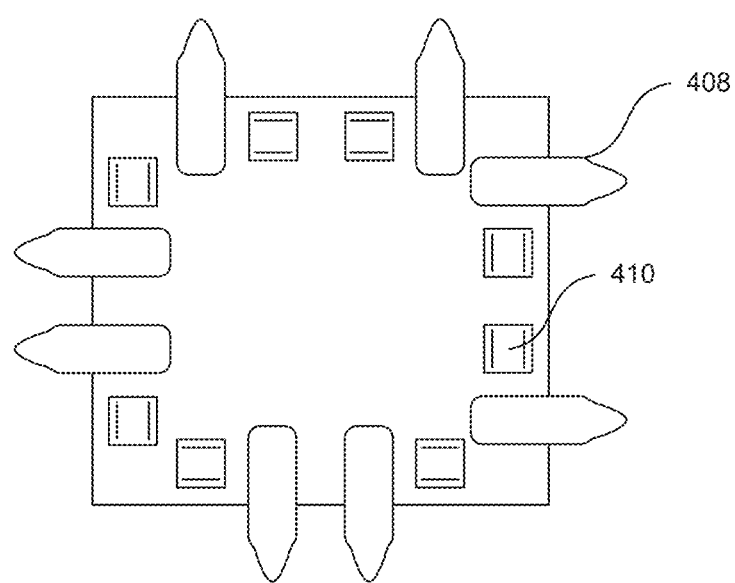
FIG. 4B is a second embodiment of a chilling panel interconnection emphasizing alternating latches.

FIG. 4B is a second embodiment of a chilling panel interconnection emphasizing alternating latches from a top view perspective. In some embodiments, in order to interconnect the chilling panels, extending latches 408 are located in a wide configuration on two adjacent sides of the chilling panel, and receiving hooks 410 for the extending latches 408 are located in a narrow configuration. On the other two adjacent sides, the narrow and wide configurations are reversed. The extending latches 408 are configured to reach around corners such that right or greater angles may be formed on the exterior of the refrigerated container.

Figure 5A:
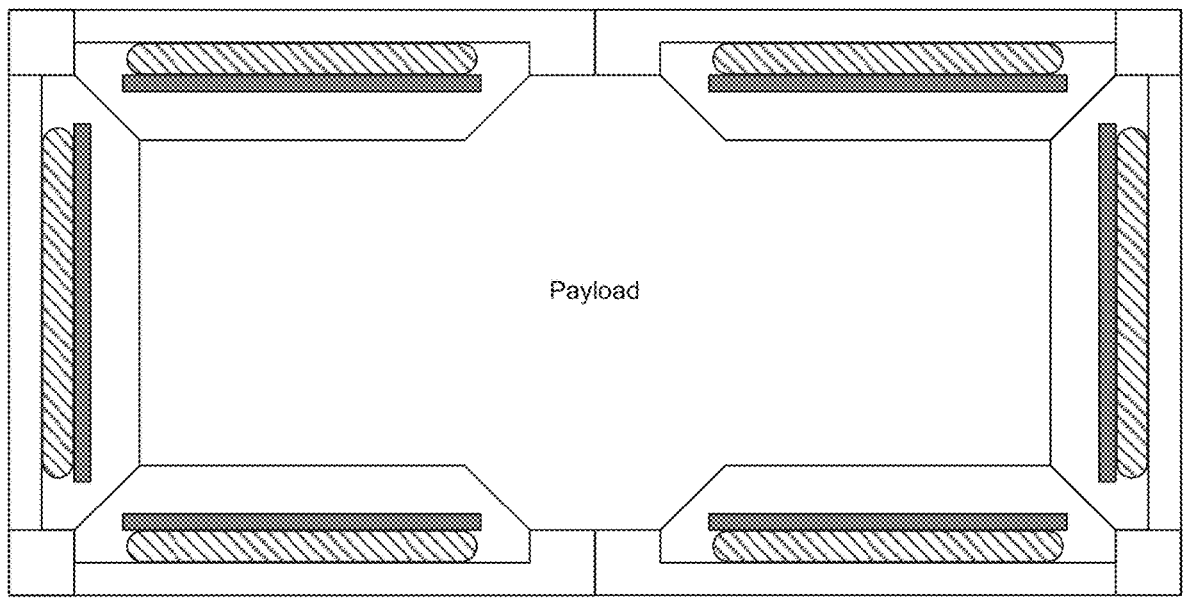
FIG. 5A is an illustration of a rectangular prism configuration for the portable refrigeration apparatus.

FIG. 5A is an illustration of a rectangular prism configuration for the portable refrigeration apparatus. As an alternative to a cuboid sealed container, a rectangular prism can be built from ten chilling panels.

Figure 5B:
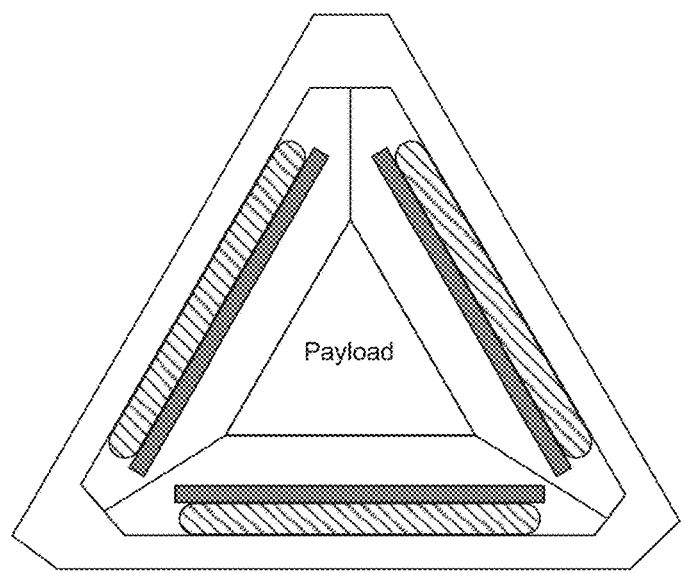
FIG. 5B is an illustration of a triangular panel for a tetrahedral portable refrigeration apparatus.

FIG. 5B is an illustration of a triangular panel for a tetrahedral portable refrigeration apparatus. As an alternative to the square chilling panels that form a cuboid or rectangular prism-shaped sealed container, some embodiments of the chilling panel are triangular. Triangular chilling panels join together to form a tetrahedron-shaped sealed container. Such a configuration is useful where the cooling element in the chilling panels is electrically powered by solar panels on the exterior of the chilling panel. The angle of the tetrahedron enables the solar panels to have a better angle with the sun.

Figure 5C:
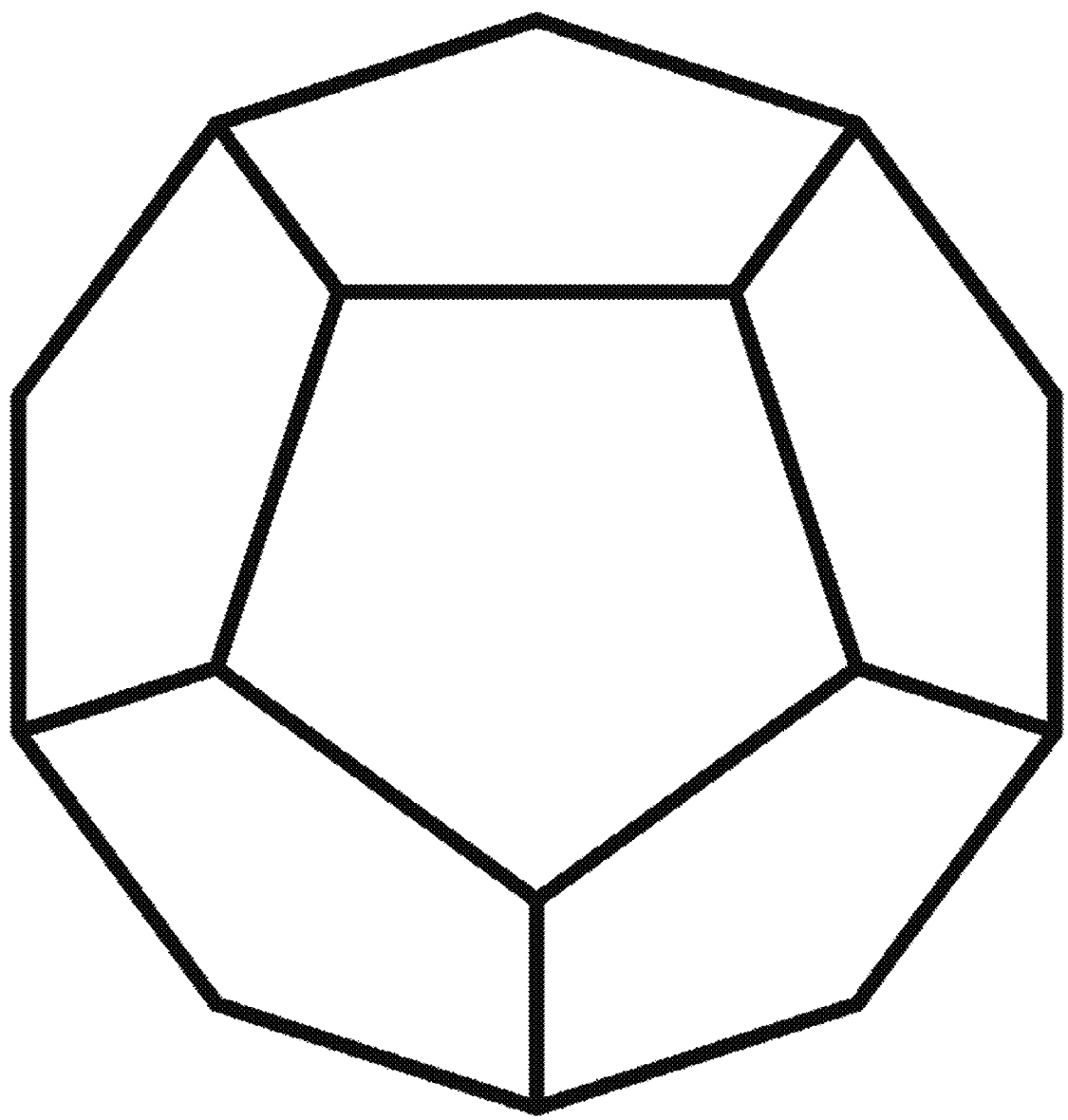
FIG. 5C is an illustration of a pentagonal panel for a dodecahedron portable refrigeration apparatus.

FIG. 5C is an illustration of a pentagonal panel for a dodecahedron shaped portable refrigeration apparatus. As an alternative to the square chilling panels that form a cuboid or rectangular prism-shaped sealed container, some embodiments of the chilling panel are pentagonal. The angle of the dodecahedron enables the refrigerated container to roll.

Portable Refrigeration Apparatus

Figure 6A:
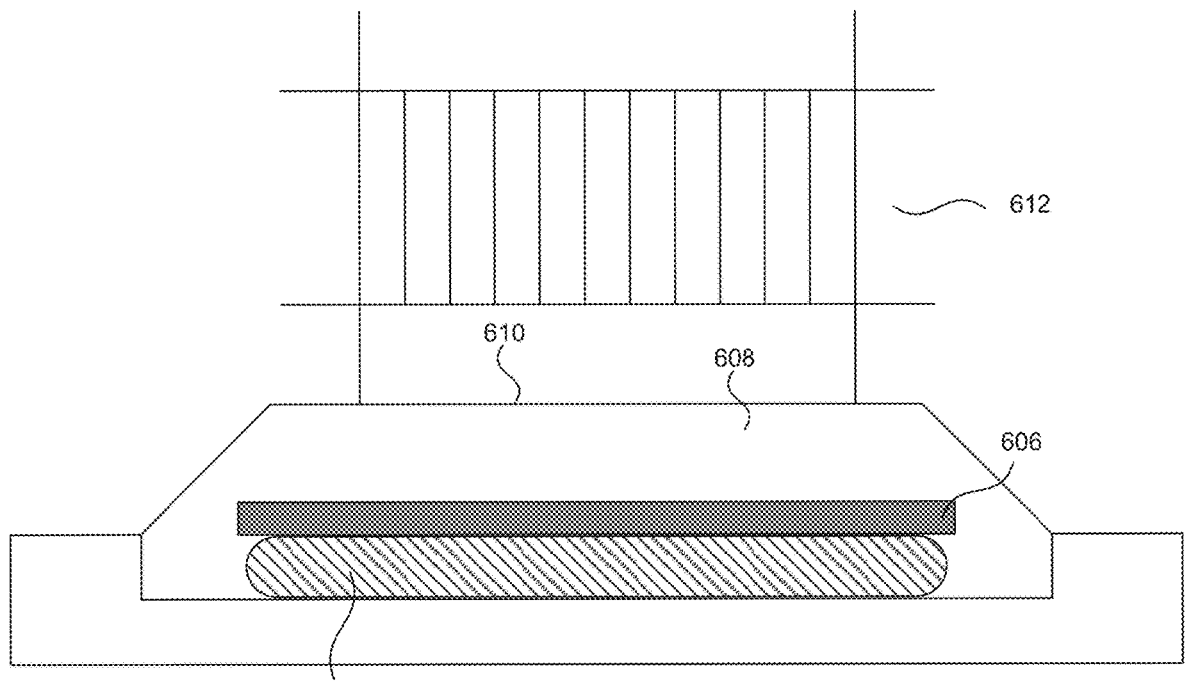
FIGS. 6A-C illustrate example bottom portion, side portion, and bottom portions of the refrigerated container, respectively.
Figure 6B:
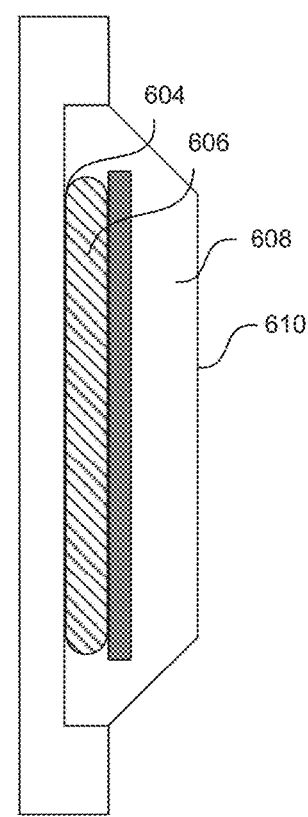

FIGS. 6A and 6B illustrate example bottom panel and side panels of the refrigeration apparatus, respectively. As discussed above, the refrigeration container utilizes the designs of the upright configuration for the top panel and the tandem design for the side panels. Specifically, the container includes the surface 610 that separates the panel from the payload space, the cooling element 604, the optional insulator 606, and water 608. The water in the top and the side portions that are closest to the payload space stay at around 4° C. for a relatively long period of time.

In some embodiments, the container similarly causes the cooling element 604 in the bottom panel to cool to a temperature that is typically at or below the freezing point of water, for example, as low as −30° C. This, in turn, causes water 608 in the immediate surroundings of the cooling element 604 to cool from the initial ambient or pre-conditioned temperature. When the water goes below 4° C., it rises to the top of the reservoir, thereby keeping the surface 610 cool at about the freezing point. However, having only one surface at below 4° C. will not substantially affect the overall temperature within the payload area.

Limiting the damaging effect of the 'floor' of the compartment being colder than 4 C is largely done by the properties of the air inside the container—The colder the air, the heavier it is and so colder conditions generated at the bottom of the compartment will tend to stay there. The effect of air stirred by the movement in transportation is weak given the ratio of thermal mass of air to that of the predominant 4 C water around the compartment.

To keep payload items away from this bottom panel, a cage 612 is positioned within the payload space that contains the payload a distance away from each of the sides of the chilling panels. The distance the cage 612 raises payload items away from the panels enables any panel to become the bottom panel without freezing the payload items. The payload items are kept off the surface of the bottom panel and thus have a layer of air insulating the payload items. The cage 612 may be collapsible for easy storage and transport.

In some embodiments, the operation of the cooling element 604 in each of the portions depends on the orientation of the container. For example, it can be beneficial that only the cooling elements in the top and side portions (relative to the ground) operate at any given time. This can prevent the bottom surface of the payload space from becoming too cold (i.e., below 4° C.). The container can include orientation sensors to determine the orientation of the container and, in turn, control the operation of the cooling elements.

Figure 6C:
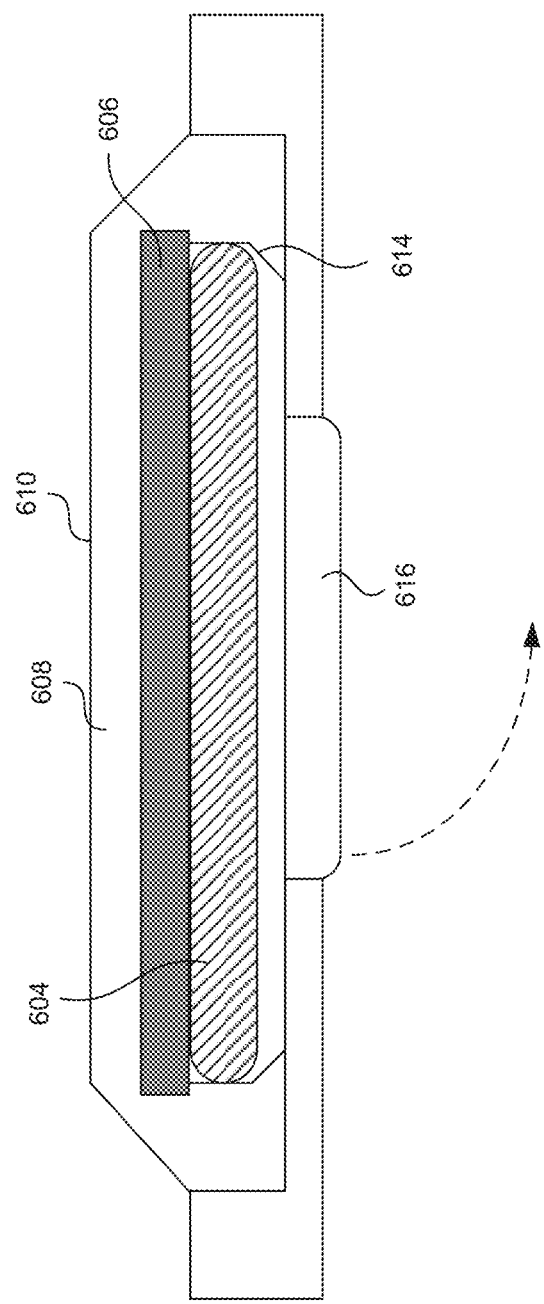

FIG. 6C illustrates a coolant container and an external hatch thereto. In some embodiments, the cooling element 604 is contained within a coolant compartment 614. A coolant compartment 614 is defined by thermally conductive side walls abutting an interior side of the casing layer and containing a cooling element 604. The coolant compartment 614 is accessible through a hatch 616 on the exterior, insulated side of the chilling panel.

Figure 7:
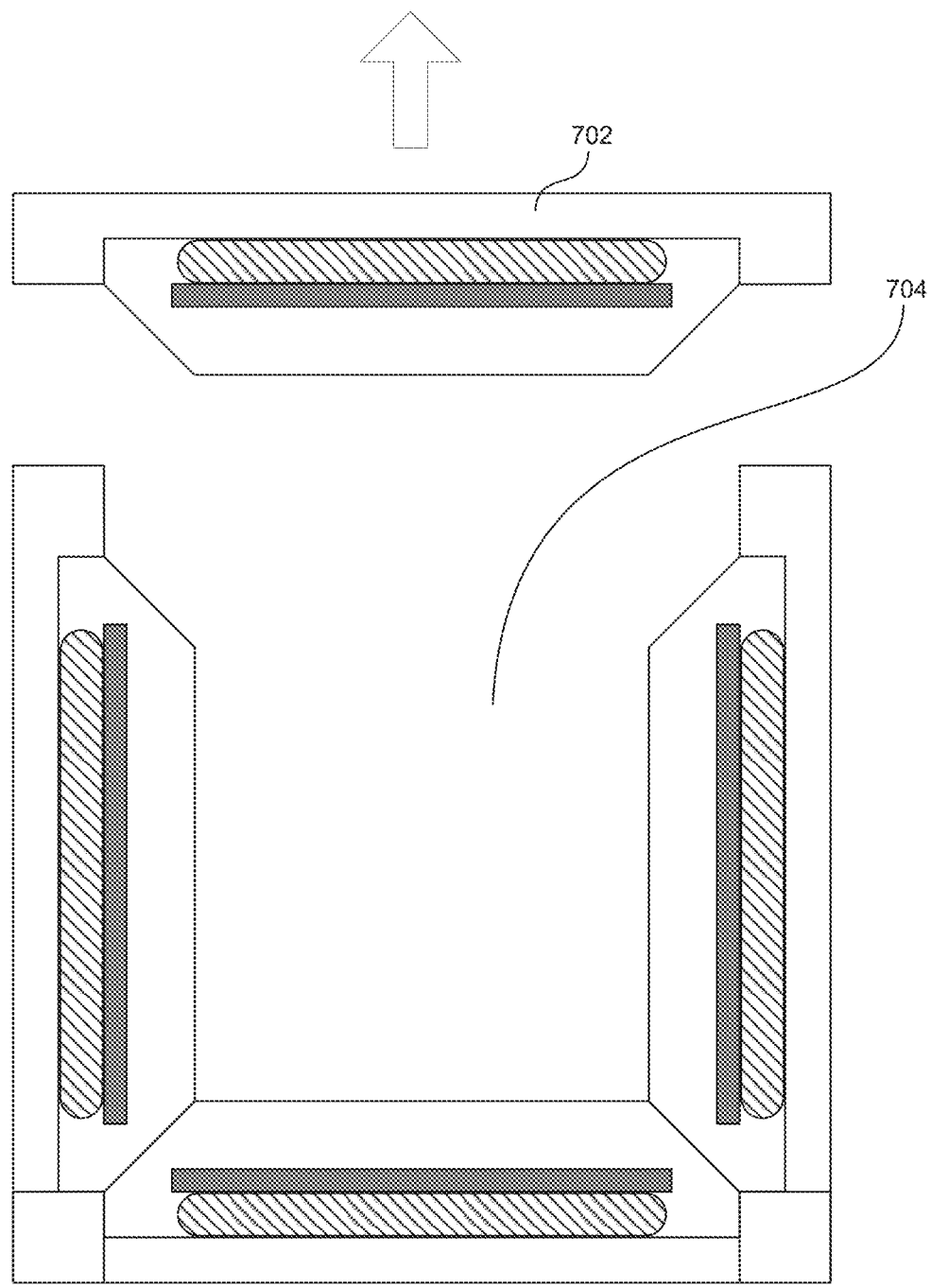
FIG. 7 illustrates an example refrigeration container with detachable portions.

FIG. 7 illustrates an example refrigerated container with detachable panels. In some embodiments, the top panel 702 can be detached from the rest of the sealed container to allow the placement of items into the payload area 704. It is to be appreciated by someone of ordinary skill in the art that all of the six panels are detachable, while the remaining panels (i.e., casing) are constructed to form a single unit. In some embodiments, five of the chilling panels are permanently interconnected while a sixth panel is detachable.

Figure 8:
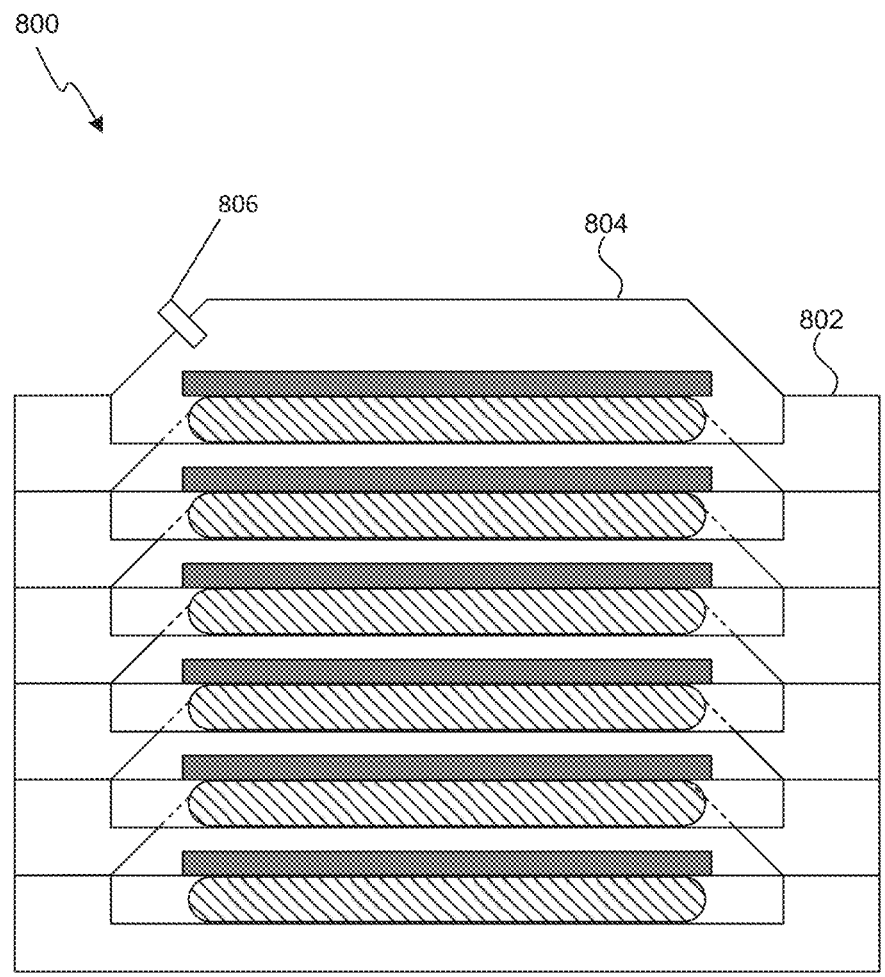
FIG. 8 illustrates an empty storage configuration of a number of chilling panels.

FIG. 8 illustrates an empty storage configuration of a number of chilling panels. When chilling panels are detached, the panels may be placed in a stacked configuration 800. In the stacked configuration 800, the exterior casing layers 802 are stacked on top of one another. In some embodiments, the reservoir compartments 804 may be constructed of collapsible or non-rigid material. Thus, the height of the stacked configuration 800 is a function of the thickness of the exterior casing layers 802. In some embodiments, the reservoir compartment 804 is rigid in shape, and thus the height of the stacked configuration 800 is a function of the thickness of all of the chilling panels. In order to supply or remove water solution from the chilling panels, a valve 806 is located on the reservoir compartment 804 that may be opened either manually or electronically.

Figure 9:
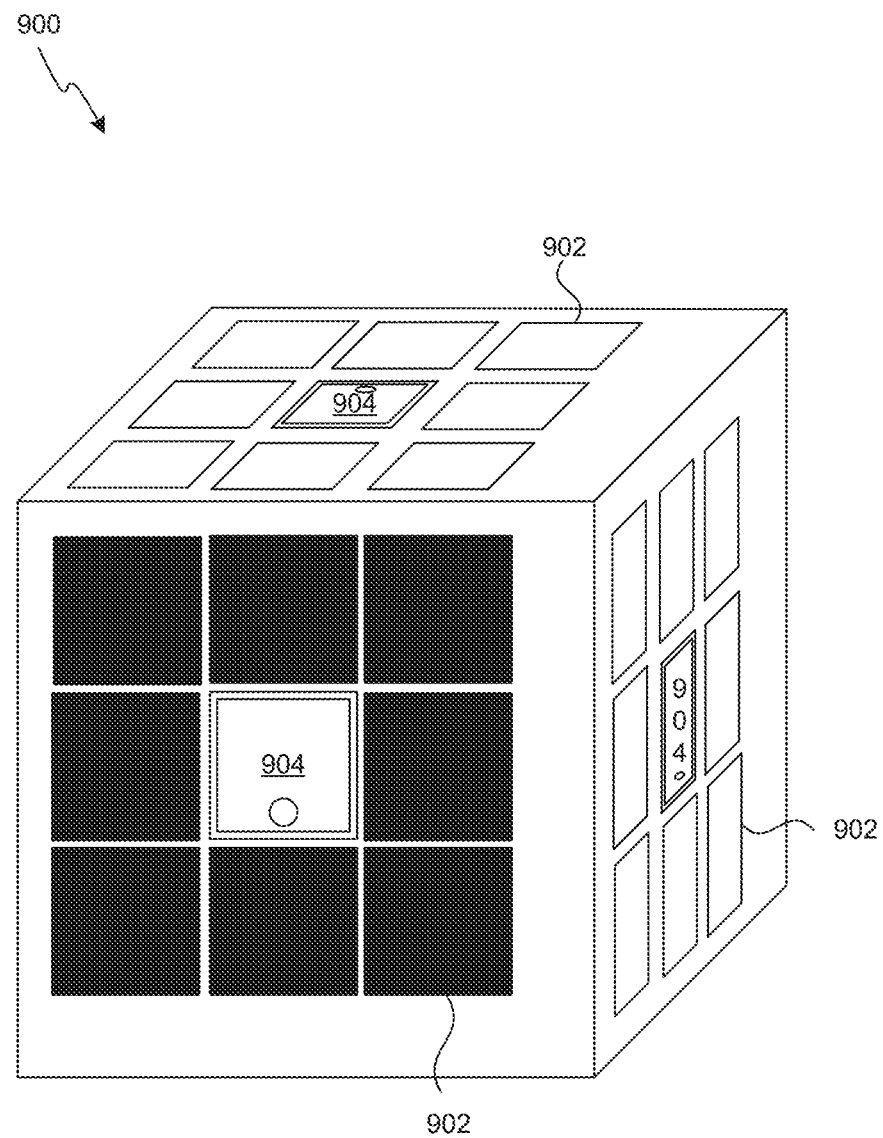
FIG. 9 illustrates a cube sealed refrigeration container including solar panels on the exterior of each chilling panel.

FIG. 9 illustrates a cube sealed refrigeration container including solar panels on the exterior of each chilling panel. In order to power the cooling element in each chilling panel, the sealed container 900 includes solar panel cells 902 on the exterior of the chilling panels. The solar panel cells 902 may include additional components of solar power systems, such as inverters and batteries that are embedded into the exterior casing layer of the chilling panels. Alternatively, the solar panel cells 902 do not include a battery and merely provide power as available. In such embodiments, the cooling element operates whenever sunlight is available. In some embodiments, a hatch 904 needed to access the cooling element is additionally on the exterior surface of the chilling panels, which takes the place of a solar panel cell 902.

Figure 10:
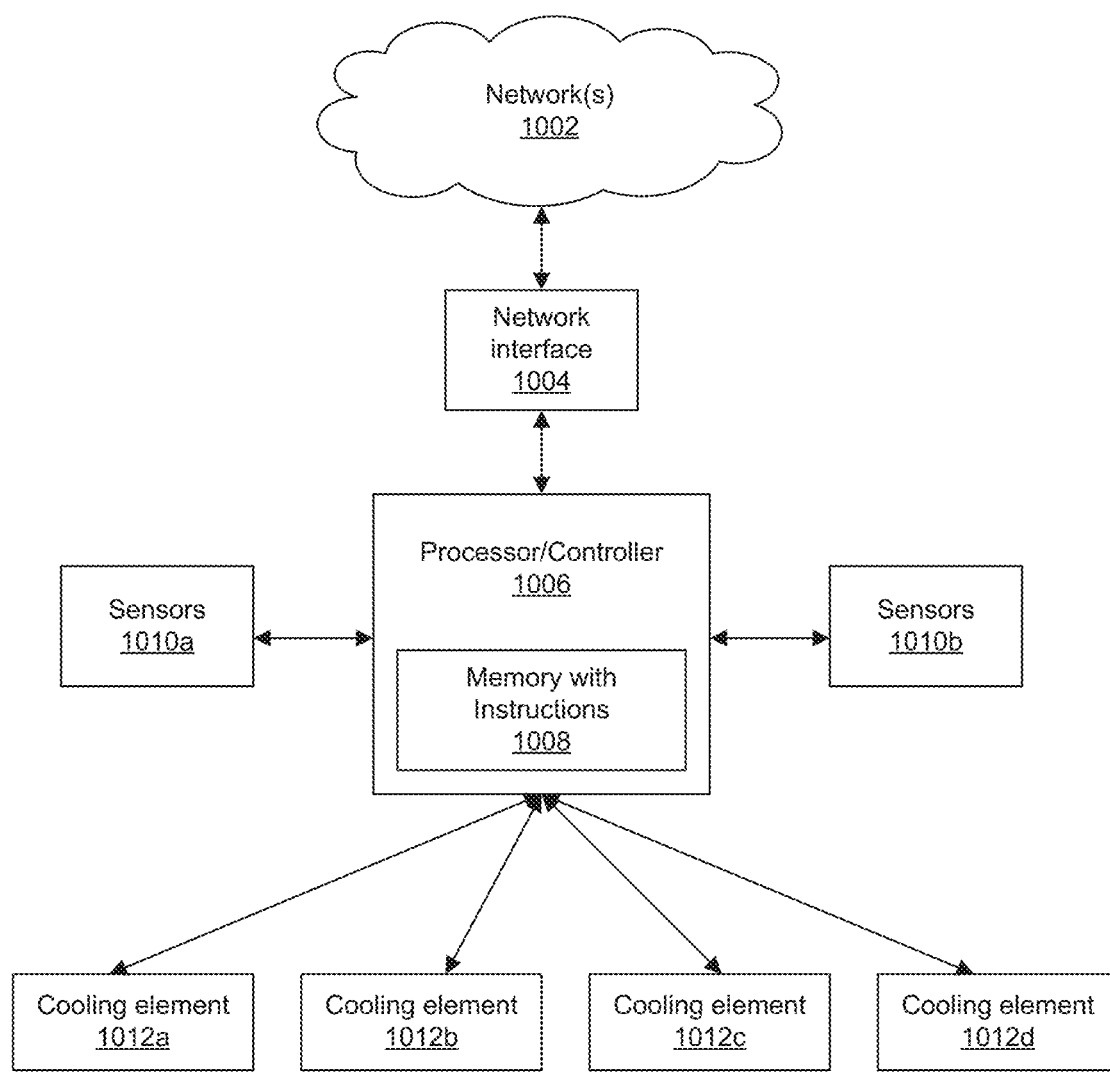
FIG. 10 illustrates an example portable refrigeration apparatus including a processor for controlling various components of the apparatus.

FIG. 10 illustrates an example portable refrigeration apparatus, including a processor for controlling various components of the apparatus. In some embodiments, the processor/controller 1006 interacts with a memory 1008 storing one or more instructions. The processor/controller 1006 is connected with a network 1002, such as the Internet or a cellular network, through a network interface 1004. The processor/controller 1006 is also connected to the various components within the refrigerated container, such as the sensors 1010a and 1010b and the batteries or power cords connected to the cooling elements 1012a-d. The processor/controller 1006 initially instructs the cooling elements 1012a-d to begin operation. Upon receiving alerts from the sensors that detect the presence of a predetermined volume of ice, the system then instructs the cooling elements 1012a-d to cease operation. Subsequently, upon receiving alerts from the sensors of detecting the absence of a predetermined volume of ice, the system again instructs the cooling elements to resume operation, thereby repeating the process. The system comprising the processor/controller 1006 and the memory 1008 can be incorporated into or attached to the refrigerated container. In that case, the system can be an embedded device or a mobile device that is directly connected to the sensors 1010a-b and a battery or a power cord that is, in turn, connected to each of the cooling elements 1012a-d. The system can perform data processing locally or rely on an external system, such as a desktop computer or a central server, to complete such tasks.

Figure 11:
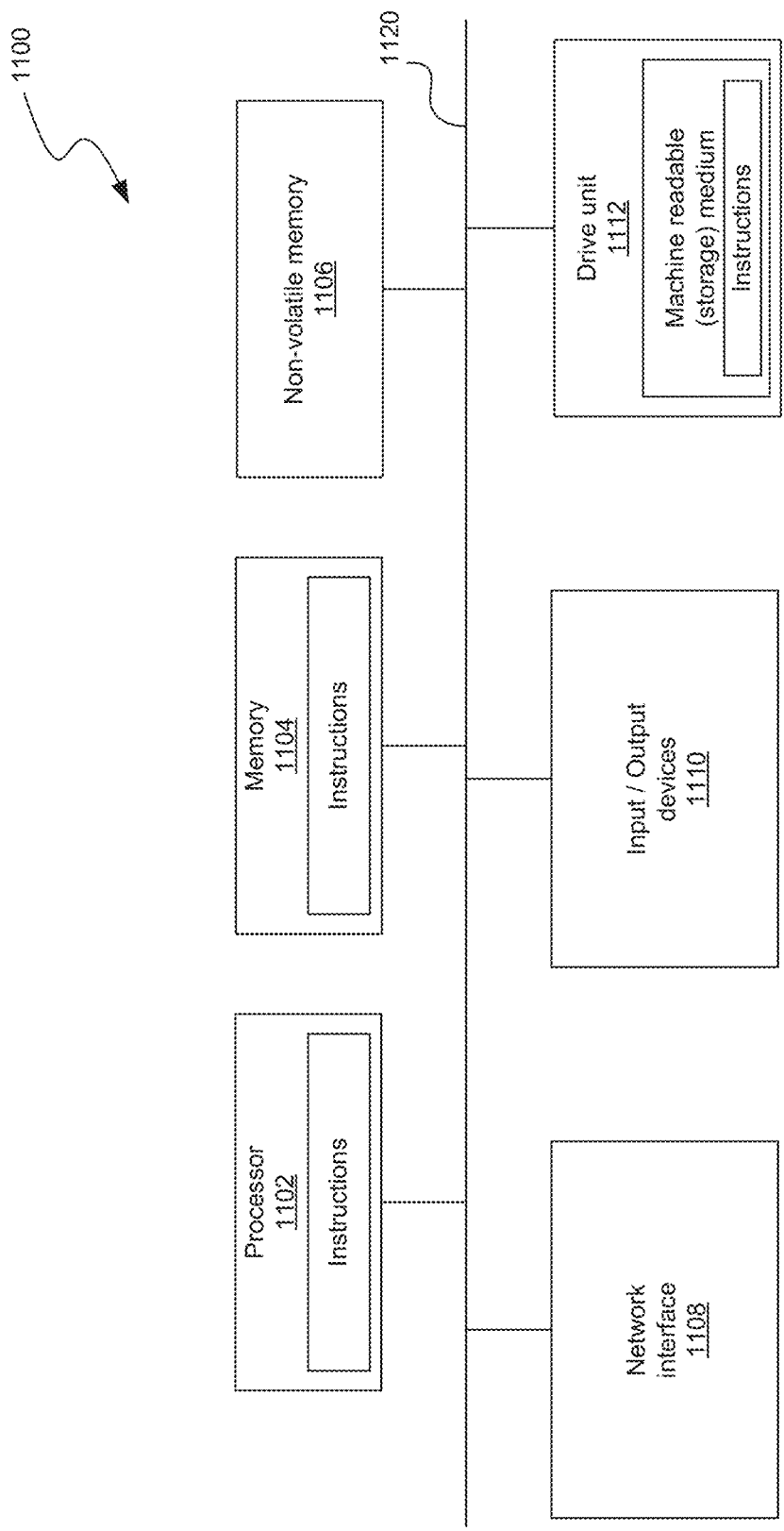
FIG. 11 illustrates a computer system that can be utilized to perform various techniques disclosed herein.

FIG. 11 illustrates a computer system that can be utilized to perform various techniques disclosed herein. The computer system 1100 includes a processor 1102, a memory 1104, non-volatile memory 1106, a network interface 1108, input/output (I/O) devices 1110, and a drive unit 1112. Various common components (e.g., cache memory) are omitted for illustrative simplicity.

The computer system 1100 is intended to illustrate a hardware device on which any of the computer components depicted in FIGS. 1-10 can be implemented. For example, the components can include the processor/controller 1006 and the memory 1008 storing instructions of FIG. 10. The computer system 1100 can be of any applicable known or convenient type. The components of the computer system 1100 can be coupled together via a bus 1120 or through some other known or convenient device.

The computer system 1100 can be embodied in any suitable physical form. For example, the computer system 1100 can be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1100 can include one or more computer systems 1100; be unitary or distributed; span multiple locations; span multiple machines; or reside in a cloud, which can include one or more cloud components in one or more networks. Where appropriate, one or more computer systems 1100 can perform, without substantial spatial or temporal limitation, one or more steps of one or more methods described or illustrated herein. For example, one or more computer systems 1100 can perform in real time or in batch mode one or more steps of one or more methods described or illustrated herein. The one or more computer systems 1100 can perform at different times or at different locations one or more steps of one or more methods described or illustrated herein, where appropriate.

The processor 1102 can be a conventional microprocessor, such as an Intel Core microprocessor, an Intel Itanium microprocessor, a Motorola power PC microprocessor, or a SPARC architecture processor. One of skill in the relevant art will recognize that the terms "machine-readable (storage) medium" and "computer-readable (storage) medium" include any type of device that is accessible by the processor.

The memory 1104 is coupled to the processor 1102 by, for example, a bus. The memory 1104 can include, for example, random access memory (RAM), such as dynamic RAM (DRAM) or static RANI (SRAM). The memory can be local, remote, or distributed.

The bus 1120 also couples the processor 1102 to the non-volatile memory 1106 and the drive unit 1112. The non-volatile memory 1106 can be, for example, a magnetic floppy or hard disk; a magnetic-optical disk; an optical disk; a flash memory, such as NAND flash memory or NOR flash memory; a read-only memory (ROM) such as a CD-ROM; a programmable read-only memory, such as EPROM or EEPROM; a magnetic or optical card; or another form of storage for large amounts of data. Some of this data is often written, by a direct memory access process, into memory during execution of software in the computer system 1100. The non-volatile storage can be local, remote, or distributed. The non-volatile memory 1106 is optional because systems can be created with all applicable data available in memory. A typical computer system will usually include at least a processor, memory, and a device (e.g., a bus) coupling the memory to the processor.

Software is typically stored in the non-volatile memory 1106 and/or the drive unit 1112. Indeed, for large programs, storing the entire program in memory may not be possible. Nevertheless, one should understand that, for software to run, if necessary, the software is moved to a computer-readable location appropriate for processing, and, for illustrative purposes, that location is referred to as the memory in this disclosure. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 1120 also couples the processor 1102 to the network interface 1108 device. The network interface 1108 can include one or more of a modem or network interface. A person of ordinary skill in the art will appreciate that a modem or network interface can be considered to be part of the computer system 1100. The network interface 1108 can include an analog modem, ISDN modem, cable modem, token ring interface, satellite transmission interface (e.g., "direct PC"), Wi-Fi interface, or other interfaces for coupling a computer system to other computer systems. The network interface 1108 can include one or more input and/or output devices.

The I/O devices 1110 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device. For simplicity, this disclosure assumes that controllers of any devices not depicted in the example of FIG. 11 reside in the network interface 1108.

The computer system can have one bus or multiple buses. The bus 1120 can include, for example, a system bus; a Peripheral Component Interconnect (PCI) bus or PCI-Express bus; a HyperTransport or industry standard architecture (ISA) bus; a small computer system interface (SCSI) bus; a universal serial bus (USB, USB 2.0, USB 3.0); IIC (I2C) bus; an Institute of Electrical and Electronics Engineers (IEEE) standard 1394 bus, also called "FireWire"; a QuickPath Interconnect bus; a ThunderBolt interconnect bus; a DisplayPort interconnect bus or its companion standards Mini DisplayPort (mDP); Direct Drive Monitor (DDM); Embedded DisplayPort (eDP); Internal DisplayPort (iDP); Portable Digital Media Interface (PDMI); Wireless DisplayPort (wDP); Mobility DisplayPort (MyDP); a high-definition multimedia interface (HDMI) interconnect bus; or a digital visual interface (DVI) bus.

In operation, the computer system 1100 can be controlled by operating system software that includes a file management system such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Figure 12:
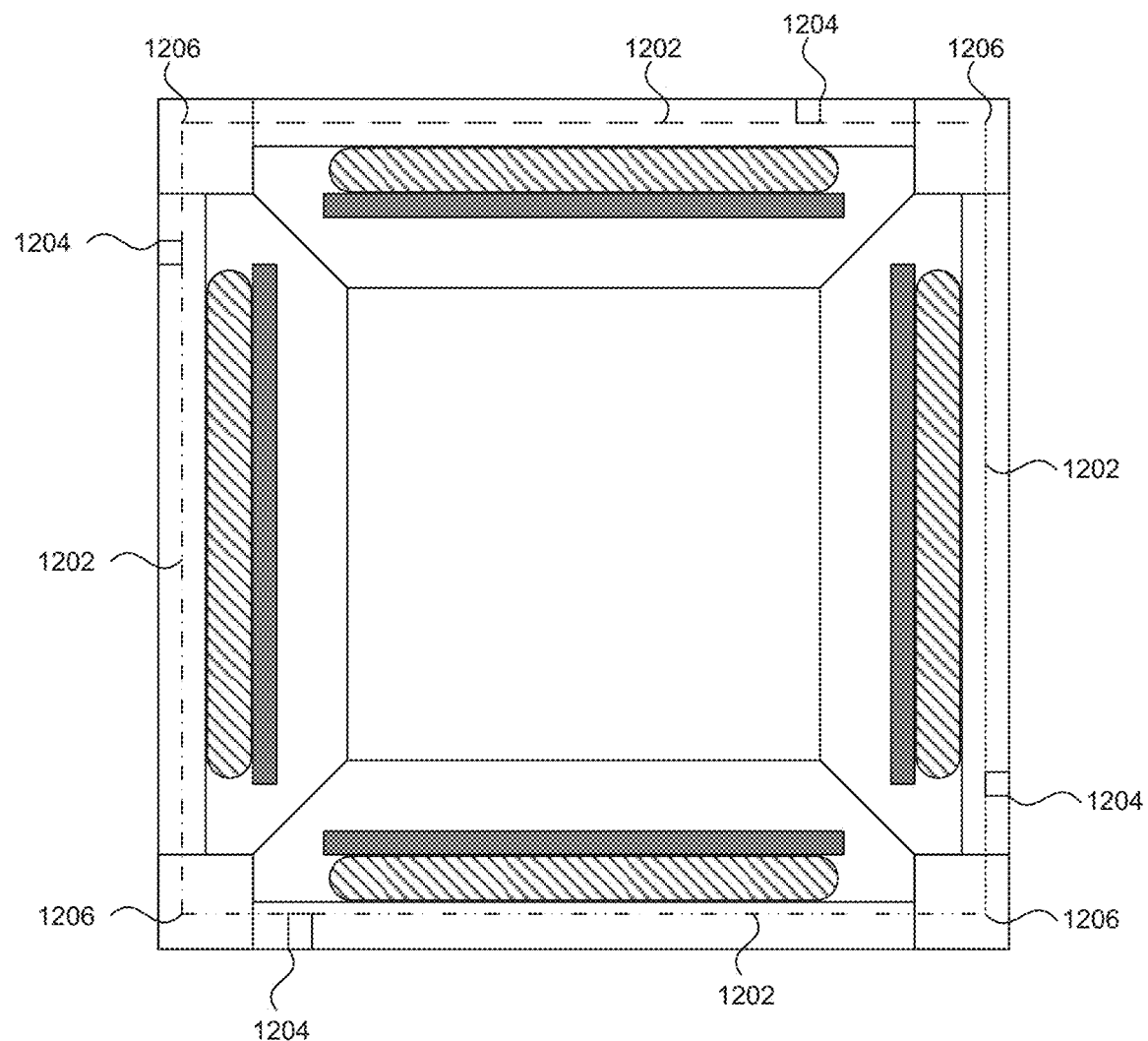
FIG. 12 illustrates an electrical system that is shared between multiple interconnected chilling panels.

FIG. 12 illustrates an electrical system that is shared between multiple interconnected chilling panels. Where a chilling panel is powered, it is understood that a given chilling panel may not receive power while others would (e.g., only a subset of the chilling panels with solar panels are facing the sun, or only a single chilling panel is plugged into an outlet). In some embodiments, chilling panels include internal wiring 1202. The internal wiring 1202 is connected to powered elements (such as the cooling element, sensors, a controller, or a network interface) and a power source 1204. The power sources 1204 include solar panels, batteries, power outlets, or other suitable power sources known in the art.

Where each of the chilling panels interconnect, contacts 1206 connect the internal wiring 1202 of each other adjacent panel. This allows electrical power held by one panel to be shared over all of the interconnected panels.

Panels further have the ability to charge individually and draw power from interconnected panels. Where ice growth sensors indicate a given panel does not need to activate the cooling element, though a neighboring ice growth sensor indicates otherwise, power is passed from the first panel to the second. In this way the cooling element which most needs the power is provided any available power first. Further panels which do not need available power are prevented from over-cooling.

Figure 13:
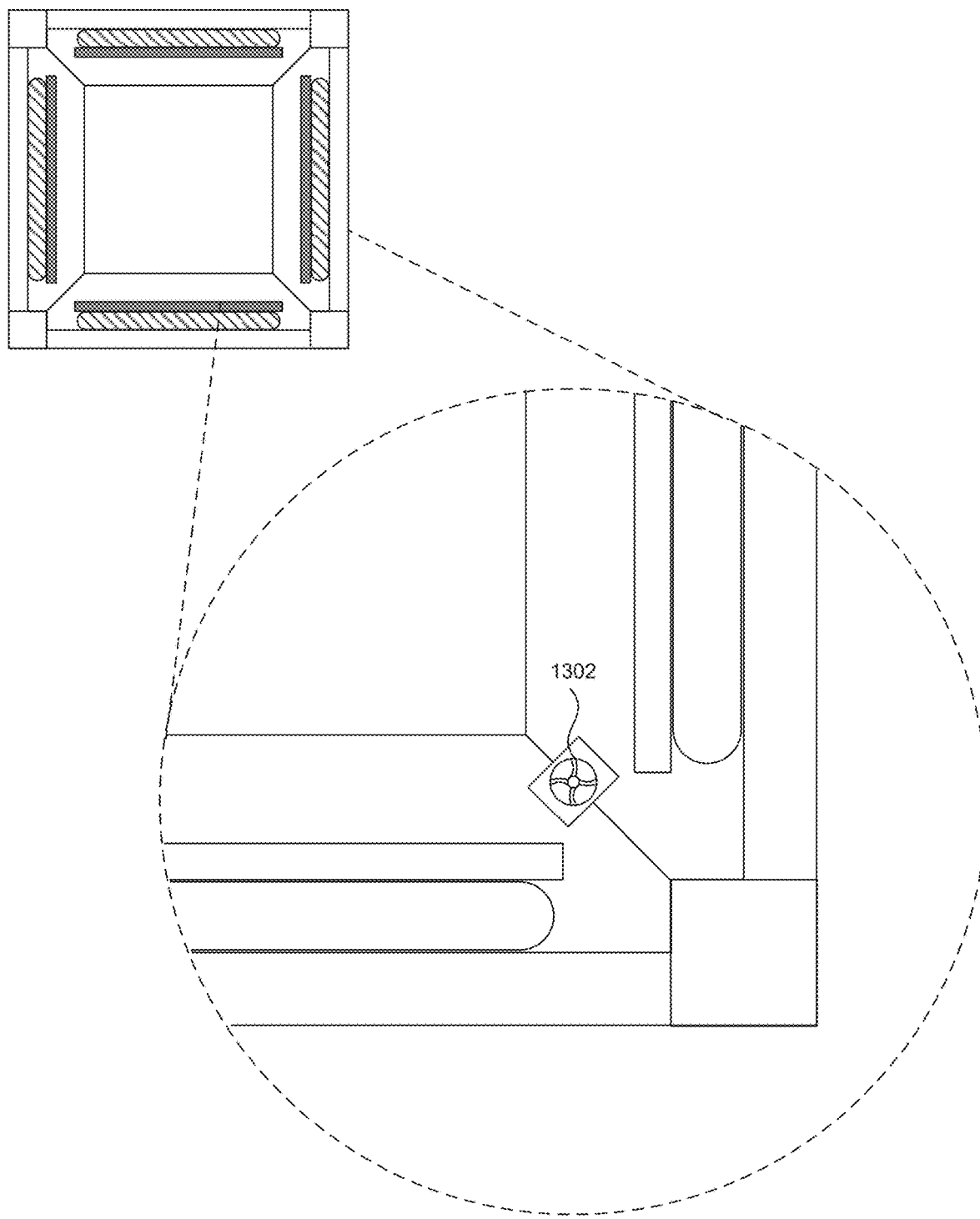
FIG. 13 illustrates an example refrigerated container with connecting mechanisms between portions where water can flow across different reservoirs.

FIG. 13 illustrates an example refrigerated container with connecting mechanisms between portions where water can flow across different reservoirs. In this example, an opening 1302, such as a valve, is installed between two portions. The opening allows volumes of water in different reservoirs to blend.

Figure 14:
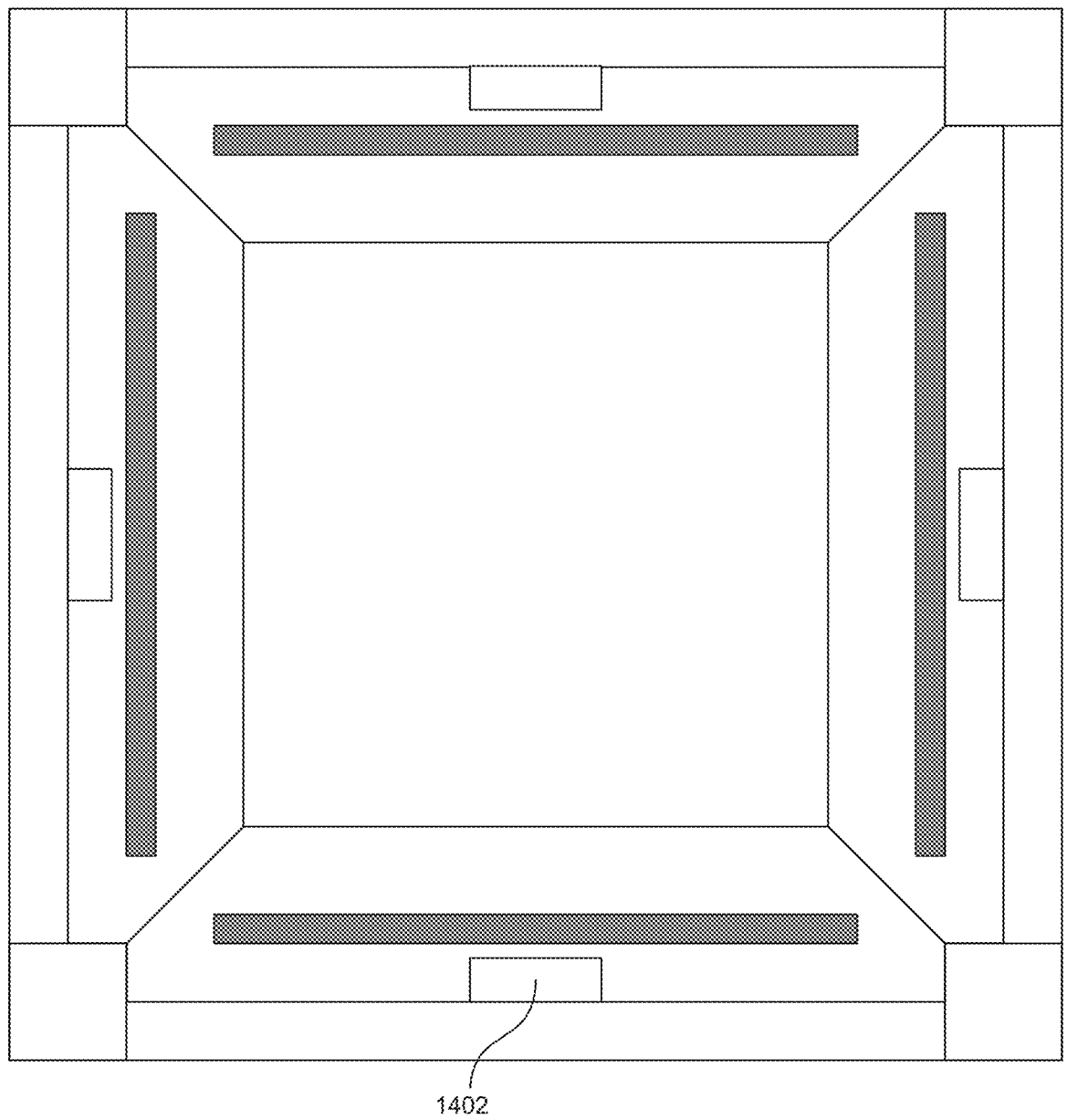
FIG. 14 illustrates an example refrigerated container where an ice pack serves as the cooling or refrigeration element.

FIG. 14 illustrates an example refrigerated container where an ice pack serves as the cooling or refrigeration element. In some embodiments, the portable refrigeration apparatus can use an ice pack 1402 instead of a power-operated cooling element that often generates ice in the surroundings. When the ice pack has a large volume, such as the size of the cooling element, and a low temperature, such as −30° C., it can take a long time for the ice to melt. The ice pack would then function as an operating cooling element, creating a temperature gradient in the reservoir, during that period of time.

Conclusion

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules without loss of generality. The described operations and their associated modules can be embodied in software, firmware, hardware, or any combinations thereof.

Any of the steps, operations, or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer-readable storage medium or any type of media suitable for storing electronic instructions, which can be coupled to a computer system bus. Furthermore, any computing systems referred to in the specification can include a single processor or can be architectures employing multiple processor designs for increased computing capability.

Embodiments of the invention can also relate to a product that is produced by a computing process described herein. Such a product can comprise information resulting from a computing process wherein the information is stored on a non-transitory, tangible computer readable storage medium and can include any embodiment of a computer program product or other data combination described herein.

Finally, the language used in the specification has been principally selected for readability and instructional purposes, and it has not been selected to delineate or circumscribe the inventive subject matter. It is therefore intended that the scope of the invention not be limited by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A chilling panel that makes up a single side of a refrigeration container comprising:
    a casing layer that is thermally insulating and forms an exterior side of the chilling panel;
    a coolant compartment abutting an interior side of the casing layer and configured to contain a cooling element;
    an inner wall layer constructed of thermally conductive material and forming the interior side of the chilling panel;
    a liquid reservoir compartment formed based on at least the inner wall layer and the interior side of the casing layer, wherein a boundary of the liquid reservoir compartment contacts both the interior of the inner wall layer and the interior of the casing layer;
    an internal thermal insulator affixed to the coolant compartment, the internal thermal insulator positioned on a surface of the coolant compartment parallel with a major plane of the chilling panel; and
    means for removably interconnecting the chilling panel with a number of other chilling panels so that when interconnected, a combination of the chilling panel and the other chilling panels forms the refrigeration container.

2. The apparatus of claim 1, wherein the cooling element is a block of ice or frozen gel pack.

3. The apparatus of claim 2, wherein the casing layer further includes:
    a hatch positioned on the exterior side and providing access to the coolant compartment.

4. The apparatus of claim 1, wherein the cooling element is a powered refrigeration unit configured to emit sub-4-degree Celsius energy to the cooling compartment.

5. The apparatus of claim 4, further comprising a solar cell mounted on the exterior side and configured to power the powered refrigeration unit.

6. The apparatus of claim 4, wherein the powered refrigeration unit is a dual surface, thermoelectric effect cooling element.

7. The apparatus of claim 1, wherein the inner wall further comprises:
a valve for filling or evacuating liquid from the liquid reservoir compartment.

8. The apparatus of claim 1, wherein the inner wall further comprises:
a vent that corresponds with another vent of other inner walls of the other chilling panels affixed to the chilling panel such that water from the liquid reservoir compartment of the chilling panel flows freely to and from the other liquid reservoir compartments of the other chilling panels.

9. The apparatus of claim 1, wherein a liquid within the liquid compartment is a water solution.

10. The apparatus of claim 1, further comprising:
a cage configured to contain payload items, the cage affixed to the inner wall of the chilling panel.

11. A mobile refrigeration system comprising:
a plurality of identical chilling panels removably interconnected to form a sealed container that defines an internal volume, each of the chilling panels containing:
a cooling element,
a fluid reservoir containing a cooling element compartment within the fluid reservoir, the cooling element compartment with the cooling element therein, wherein the fluid reservoir is in fluid communication with the cooling element, and
an internal thermal insulator affixed to the cooling element compartment, wherein the internal thermal insulator insulates liquid contained in the fluid reservoir from cooling of the cooling element on a surface of the cooling element parallel with a major plane of each respective chilling panel; and
a cage positioned inside the internal volume of the sealed container and configured to secure a payload a distance from an internal surface of the sealed container.

12. The system of claim 11, wherein the cooling element of each chilling panel comprises ice or frozen gel packs.

13. The system of claim 12, wherein each chilling panel further includes:
a hatch positioned on an exterior side and providing access to the cooling element.

14. The system of claim 11, wherein the cooling element of each chilling panel is a powered refrigeration unit configured to emit sub-4-degree Celsius energy to the cooling element compartment.

15. The system of claim 11, wherein the formed sealed container is any of:
a cube;
a rectangular prism;
a dodecahedron; or
a tetrahedron.

16. A mobile refrigeration system comprising:
a number of removably interconnected chilling panels that define a sealed container with an internal volume, wherein each chilling panel includes a reservoir containing a cooling element compartment within the reservoir;
cooling elements positioned within the cooling element compartment of each of the interconnected chilling panels and accessible from the exterior of the mobile refrigeration system, wherein an insulating liner is affixed to each cooling element container along a major plane of each respective chilling panel; and
wherein the reservoir of each chilling panel is positioned on the interior of the sealed container and on each side of the internal volume and in thermal communication with air within the internal volume, wherein fluid in the reservoirs is insulated from respective cooling elements via each of the respective insulating liners on the major plane of each respective chilling panel, wherein each reservoir includes a valve configured to allow the flow of liquids to and from the compartment.

17. The mobile refrigeration system of claim 16, wherein at least one of the chilling panels includes an electrical outlet electrically connected to the cooling element within that chilling panel, and each of the chilling panels include electrical contacts thereby enabling transfer of electrical power between chilling panels.

18. The mobile refrigeration system of claim 17, wherein the cooling element of each chilling panel is a powered refrigeration unit configured to emit sub-4-degree Celsius energy to the cooling compartment.

19. The mobile refrigeration system of claim 16, wherein the reservoir of each chilling panel further includes:
a vent that corresponds with another vent of another reservoir of the other chilling panels affixed to the chilling panel such that water from the reservoirs of the chilling panel flows freely to and from the other reservoirs of the other chilling panels.

20. The mobile refrigeration system of claim 16, wherein the cooling element is a block of ice or frozen gel pack.

* * * * *